United States Patent
Hu et al.

(10) Patent No.: US 12,245,169 B2
(45) Date of Patent: Mar. 4, 2025

(54) METHODS, APPARATUSES, AND PROCESSOR-READABLE MEDIA FOR CELL GROUP CONFIGURATION PARAMETER CHANGING

(71) Applicant: Huawei Technologies Co., Ltd., Shenzhen (CN)

(72) Inventors: Xingxing Hu, Shanghai (CN); Hongping Zhang, Shenzhen (CN); Rui Wang, Shanghai (CN); Wenjie Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 345 days.

(21) Appl. No.: 17/738,171

(22) Filed: May 6, 2022

(65) Prior Publication Data

US 2022/0264486 A1 Aug. 18, 2022

Related U.S. Application Data

(63) Continuation of application No. PCT/CN2019/116786, filed on Nov. 8, 2019.

(51) Int. Cl.
*H04W 52/36* (2009.01)
*H04L 1/00* (2006.01)
(Continued)

(52) U.S. Cl.
CPC ......... *H04W 52/367* (2013.01); *H04L 1/0038* (2013.01); *H04W 52/146* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 2016/0302256 A1* | 10/2016 | Susitaival | H04W 76/18 |
| 2017/0006599 A1* | 1/2017 | Dinan | H04L 5/0035 |

(Continued)

FOREIGN PATENT DOCUMENTS

| | | |
|---|---|---|
| CN | 105451364 A | 3/2016 |
| CN | 109756994 A | 5/2019 |

(Continued)

OTHER PUBLICATIONS

"3rd Generation Partnership Project;Technical Specification Group Radio Access Network; NR; Requirements for support of radio resource management (Release 16)," 3GPP TS 38.133 V16.1.0, Sep. 2019, 1045 pages.

(Continued)

*Primary Examiner* — Faiyazkhan Ghafoerkhan
(74) *Attorney, Agent, or Firm* — Slater Matsil, LLP

(57) ABSTRACT

A communication method and a communication apparatus, the method including receiving first information from a network device, where the first information indicates, to a terminal device, to suspend a secondary cell group (SCG), suspending the SCG based on the first information, and changing a configuration parameter of a master cell group (MCG), where the configuration parameter comprises at least one of an available uplink transmission time period, a maximum transmit power, or a control channel blind detection parameter.

20 Claims, 8 Drawing Sheets

(51) Int. Cl.
*H04W 52/14* (2009.01)
*H04W 76/15* (2018.01)

(56) References Cited

U.S. PATENT DOCUMENTS

| | | | | |
|---|---|---|---|---|
| 2018/0124612 | A1* | 5/2018 | Babaei | H04W 72/23 |
| 2018/0184482 | A1* | 6/2018 | Susitaival | H04W 76/15 |
| 2018/0278357 | A1* | 9/2018 | Kim | H04J 11/0076 |
| 2019/0182883 | A1* | 6/2019 | He | H04W 76/18 |
| 2019/0215891 | A1* | 7/2019 | Susitaival | H04W 76/27 |
| 2019/0364517 | A1* | 11/2019 | Gaal | H04W 76/16 |
| 2019/0387569 | A1* | 12/2019 | Martinez Tarradell | H04W 68/02 |
| 2020/0351968 | A1* | 11/2020 | Yilmaz | H04W 76/19 |
| 2021/0067409 | A1* | 3/2021 | Byun | H04L 41/0813 |
| 2021/0281552 | A1* | 9/2021 | Van Der Velde | H04W 76/15 |
| 2022/0117027 | A1* | 4/2022 | Martinez Tarradell | H04W 68/02 |
| 2022/0159483 | A1* | 5/2022 | Lee | H04W 24/04 |
| 2022/0264486 | A1* | 8/2022 | Hu | H04W 76/20 |
| 2022/0279537 | A1* | 9/2022 | Freda | H04W 72/569 |
| 2022/0386207 | A1* | 12/2022 | Rugeland | H04W 76/15 |
| 2022/0394583 | A1* | 12/2022 | Deenoo | H04W 74/0841 |
| 2023/0309179 | A1* | 9/2023 | Ingale | H04W 36/0069 |
| 2024/0008134 | A1* | 1/2024 | Martinez Tarradell | H04W 24/10 |
| 2024/0129983 | A1* | 4/2024 | Yilmaz | H04W 76/27 |

FOREIGN PATENT DOCUMENTS

| | | |
|---|---|---|
| WO | 2019032002 A1 | 2/2019 |
| WO | 2019206089 A1 | 10/2019 |

OTHER PUBLICATIONS

"Further Consideration on SCG Reconfiguration for RRC_Inactive," Source: ZTE Corporation, Sanechips, Agenda item: 10.5.1, Document for: Discussion and Decision, 3GPP TSG-RAN WG2 Meeting#103-bis, R2-1813945, Chengdu, China Oct. 8-12, 2018, 5 pages.

"Utilization of MCG Failure Recovery via SCG Link," Agenda Item: 11.10.5, Source: LG Electronics Inc., Document for: Discussion and Decision, 3GPP TSG-RAN WG2 #106, R2-1907213, Resubmission of R2-1905058, Reno, USA, May 13-17, 2019, 2 pages.

"Guaranteed Power of Power Headroom in EN-DC," Agenda Item: 10.3.1.12, Source: Samsung, Document for: Discussion & Decision, 3GPP TSG-RAN WG2 #100, R2-1713774 (Resubmission of R2-1711798), Reno, USA, Nov. 27-Dec. 1, 2017, 4 pages.

"Further Aspects of Fast MCG Link Recovery," Agenda Item: 11.10.5, Source: InterDigital Inc., Document for: Discussion, Decision, 3GPP RAN WG2 Meeting #106, R2-1906391, Reno, USA, May 13-17, May 2019, 2 pages.

"Suspension of SCG," Agenda Item: 11.10.4.2, Source: Nokia, Nokia Shanghai Bell, WID/SID: LTE_NR_DC_CA—Core-Release 16, Document for: Discussion and Decision, 3GPP TSG-RAN WG2 Meeting #107, R2-1909012, R2-1906181, Prague, Czech Republic, Aug. 26-30, 2019, 3 pages.

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.7.0, Sep. 2019, 962 pages.

"3rd Generation Partnership Project; Technical Specification Group Radio Access Network; Evolved Universal Terrestrial Radio Access (E-UTRA) and NR; Multi-connectivity; Stage 2 (Release 15)," 3GPP TS 37.340 V15.7.0, Sep. 2019, 70 pages.

"3rd Generation Partnership Project; Technical Specification Group Radio Access Network; NR; NR and NG-RAN Overall Description; Stage 2 (Release 15)," 3GPP TS 38.300 V15.7.0, Sep. 2019, 99 pages.

"3rd Generation Partnership Project; Technical Specification Group Radio Access Network; NR; Medium Access Control (MAC) protocol specification (Release 15)," 3GPP TS 38.321 V15.7.0, Sep. 2019, 78 pages.

"3rd Generation Partnership Project; Technical Specification Group Radio Access Network; NR; Radio Resource Control (RRC) protocol specification (Release 15)," 3GPP TS 38.331 V15.7.0, Sep. 2019, 527 pages.

* cited by examiner

METHODS, APPARATUSES, AND PROCESSOR-READABLE MEDIA FOR CELL GROUP CONFIGURATION PARAMETER CHANGING

CROSS-REFERENCE TO RELATED APPLICATIONS

This application is a continuation of International Patent Application No. PCT/CN2019/116786, filed on Nov. 8, 2019. The disclosure of the aforementioned application is hereby incorporated by reference in its entirety.

TECHNICAL FIELD

This application relates to the communication field, and more specifically, to a communication method and a communication apparatus.

BACKGROUND

In a dual connectivity (DC) application scenario in the communication field, a core network and a terminal device may perform data communication by using two base stations: a master node (MN) and a secondary node (SN). In this period, the terminal device needs to simultaneously perform monitoring and data transmission on two air interface links corresponding to a master cell group (MCG) provided by the master node and a secondary cell group (SCG) provided by the secondary node. Consequently, power consumption is relatively high. When a data rate of the terminal device frequently fluctuates, for example, when the terminal device is often in a low data rate state, if the terminal device is always in a DC working mode, energy consumption on the SCG link is wasted. In an existing solution, when the terminal device is in a high data rate state, an SN is added, to enable the terminal device to be in a DC working mode, and when the terminal device is in a low data rate state, an SN is released, to enable the terminal device to be in a single connectivity working mode. A process of adding an SN and a process of releasing an SN involve exchange of a plurality of pieces of information between the MN and the SN, and the MN needs to perform reconfiguration for the terminal device on the air interface link. Consequently, additional signaling overheads and a delay are caused.

For these problems, a method is proposed in the existing solution. To be specific, when a rate is low, it indicates that the terminal device suspends (store, suspend) an SCG configuration, and does not perform data transmission by using the SCG, and when the SCG link needs to be used (for example, when the data rate of the terminal device is high), it indicates that the terminal device restores (restore, resume) the SCG configuration, and continues to perform data transmission by using the SCG. However, after the SCG configuration is suspended, available configurations of the terminal device are reduced. Consequently, a data transmission rate is reduced.

SUMMARY

This application provides a communication method and a communication apparatus, to optimize a configuration of a terminal device that is used when an SCG is suspended.

According to a first aspect, a communication method is provided. The method includes: receiving first information from a network device, where the first information is used to indicate a terminal device to suspend a secondary cell group (SCG), suspending the SCG based on the first information, and changing a configuration parameter of a master cell group MCG, where the configuration parameter includes at least one of the following parameters: an available uplink transmission time period, a maximum transmit power, or a control channel blind detection parameter.

It should be noted that the configuration parameter of the MCG may be changed when the SCG starts to be suspended, at any time during the SCG suspension, or at any time after the SCG is suspended (which may also be referred to as an SCG suspend state). A time period for changing the configuration parameter of the MCG does not need to be specifically determined. Therefore, for ease of description, "suspend an SCG", "when an SCG is suspended", and the like all can be used to reflect an "SCG suspension" process.

According to the foregoing technical solution, when suspending the SCG, the terminal device changes an original configuration parameter of the MCG, in other words, changes the configuration parameter of the MCG, so that a changed configuration parameter of the MCG is more suitable for a scenario in which the SCG has been suspended. Therefore, the terminal device may also have a relatively good transmission effect when performing data transmission by using only the MCG.

Optionally, the network device may be an MN or an SN, in other words, the first information may be sent by the MN or the SN.

It should be noted that "suspend/suspension" in this application may also be referred to as "deactive/deactivation", "inactive/inactivation", "dormancy", or the like, and "suspend state" in this application may also be referred to as "deactive state", "inactive state" (inactive state), "dormant state", or the like.

In this application, "suspend/suspension" may mean that the terminal device temporarily stops performing data transmission through an SCG communication link, but the terminal device reserves or stores some or all configurations of the SN, so as to quickly restore the SCG communication link. Similarly, if a Primary secondary cell (PScell) is in a suspend state, it indicates that a configuration of the PScell may be reserved, but data transmission performed by using the PScell is stopped.

With reference to the first aspect, in some implementations of the first aspect, the method further includes: The terminal device may change the configuration parameter of the MCG based on a preset configuration parameter sent by the network device. The preset configuration parameter includes the configuration parameter of the MCG and a configuration parameter of the SCG. After receiving the preset configuration parameter, the terminal device changes the configuration parameter of the MCG based on a corresponding preset configuration parameter, in the preset configuration parameter, that is used when the SCG is suspended.

It should be noted that the foregoing preset configuration parameter includes a corresponding configuration parameter of the MCG and a corresponding configuration parameter of the SCG that are used when the SCG is suspended and a corresponding configuration parameter of the MCG and a corresponding configuration parameter of the SCG that are used when the SCG is not suspended.

In other words, different configuration parameters are preset when the SCG is suspended and when the SCG is not suspended, so that the terminal device can select a configuration parameter based on a currently actual state of the SCG. For example, in the preset configuration parameter, if available uplink transmission time periods are respectively configured when the SCG is suspended and when the SCG is not suspended, the terminal device may select a pre-allocated available uplink transmission time period based on the actual state indicating whether the SCG is suspended. For another example, in the preset configuration parameter, if blind detection parameters are respectively configured when the SCG is suspended and when the SCG is not suspended, the terminal device may select a pre-allocated blind detection parameter based on the actual state indicating whether the SCG is suspended.

With reference to the first aspect, in some implementations of the first aspect, the method further includes: changing configuration parameter allocation between the MCG and the SCG. After the SCG is suspended, a resource corresponding to each configuration parameter can be reallocated through configuration parameter reallocation, so that a configuration of the MCG is optimized, to meet a special requirement when the SCG is suspended.

In other words, when the configuration parameter of the MCG is changed, a proportion or a rule of allocating the configuration parameter of the SCG and the configuration parameter of the MCG when the SCG is not suspended may be further adjusted, so as to change the configuration parameter of the MCG. For example, if an available uplink transmission time period of the terminal device is T, and available uplink transmission time periods of the SCG and the MCG are respectively T/2 and T/3 before the SCG is suspended, an allocation proportion for the MCG may be increased after the SCG is suspended, for example, a part or all of the original uplink transmission time period T/3 of the SCG may be allocated to the MCG, or the available uplink transmission time period of the MCG may be directly changed to T.

With reference to the first aspect, in some implementations of the first aspect, the method further includes: when the configuration parameter includes the available uplink transmission time period, extending the available uplink transmission time period of the MCG.

The available uplink transmission time period is a time period for sending uplink data by the terminal device, in other words, is used to indicate a specific time period or a specific moment for sending uplink data by the terminal device. If the network device configures an available uplink transmission time period for each of the MCG and the SCG for the terminal device when the SCG is not suspended, a time period for sending uplink data by each of the MCG and the SCG is limited. Therefore, when the SCG is suspended, the available uplink transmission time period of the MCG may be extended, so that the MCG can perform data transmission in more time periods.

By extending the foregoing available uplink transmission time period of the MCG, the MCG may not comply with an original allocation rule, but may perform uplink data transmission in more available data transmission time periods without being limited by a configuration parameter that is delivered by a master node and that is of the terminal device in an uplink time period that can be used by the MCG.

For example, an available uplink transmission time period of the MCG that is used before the SCG is suspended is extended, so that an extended available uplink transmission time period of the MCG further includes a part or all of an available uplink transmission time period of the SCG that is used when the SCG is not suspended and/or a part or all of the available uplink transmission time period other than the available uplink transmission time periods of the MCG and the SCG. For another example, an available uplink transmission time period of the terminal device may alternatively be determined as the available uplink transmission time period of the MCG that is used when the SCG is suspended.

In the foregoing process of changing the available uplink transmission time period of the MCG, after the terminal device suspends the SCG, a part or all of the available uplink transmission time period originally allocated to the SCG is allocated to the MCG, or a previously vacant available time period (that is, the available uplink transmission time period other than the available uplink transmission time periods of the MCG and the SCG) is allocated to the MCG. This method is equivalent to extending the available uplink transmission time period of the MCG, so that the MCG can perform uplink data transmission in more time periods.

With reference to the first aspect, in some implementations of the first aspect, the method further includes: when the configuration parameter includes the maximum transmit power, increasing the maximum transmit power of the MCG.

Optionally, when a sum of the maximum transmit power of the MCG and a maximum transmit power of the SCG is less than or equal to a maximum transmit power of the terminal device, the sum of the two is determined as a maximum transmit power of the MCG, or when a sum of the two is greater than a maximum transmit power of the terminal device, the maximum transmit power of the terminal device is determined as a maximum transmit power of the MCG.

By changing power allocation, when suspending the SCG, the terminal device may send uplink data by fully using a higher uplink power. This increases a throughput rate of sending data by the terminal device.

Optionally, the maximum transmit power of the SCG may be further allocated to a maximum transmit power of each carrier of the master node in proportion or on average. In this manner, a more granular change can be implemented, and the maximum transmit power of each carrier is controlled at a carrier level.

With reference to the first aspect, in some implementations of the first aspect, the method further includes: when the configuration parameter includes the control channel blind detection parameter, changing the blind detection parameter of the MCG based on the preset blind detection parameters configured by the network device.

A physical downlink control channel (PDCCH) blind detection parameter may be, for example, the reference number of cells for PDCCH blind detection for the CG (MCG or SCG).

It is assumed that, when the SCG is not suspended, the network device preconfigures, for the terminal device, two groups of corresponding PDCCH blind detection parameters that are respectively used when the SCG is suspended and when the SCG is not suspended. In this case, the terminal device may select a preconfigured PDCCH blind detection parameter based on the actual state indicating whether the SCG is suspended.

Optionally, the preset blind detection parameters configured by the network device may include a first preset blind detection parameter and a second preset blind detection parameter. The first preset blind detection parameter is a blind detection parameter used by the MCG when the SCG is suspended, and the second preset blind detection parameter is a blind detection parameter used by the MCG when the SCG is not suspended. In this case, the terminal device may select a corresponding blind detection parameter based on the currently actual state. For example, the first preset blind detection parameter is selected when the SCG is suspended, and the second preset blind detection parameter is selected when the SCG is not suspended.

It is assumed that, when the SCG is not suspended, the network device preconfigures, for the terminal device, two groups of corresponding PDCCH blind detection parameters that are respectively used when the terminal device is in a single connectivity state and when the terminal device is in a dual connectivity state. In this case, the terminal device may select a PDCCH blind detection parameter based on the actual state indicating whether the SCG is suspended. For example, the preset blind detection parameters configured by the network device may further include a third preset blind detection parameter and a fourth preset blind detection parameter. The third preset blind detection parameter is a blind detection parameter used when the terminal device is in a single connectivity state, and the fourth preset blind detection parameter is a blind detection parameter used when the terminal device is in a dual connectivity state. In this case, the terminal device may select a corresponding blind detection parameter based on the currently actual state. For example, the third preset blind detection parameter is selected when the SCG is suspended, and the fourth preset blind detection parameter is selected when the SCG is not suspended. In other words, when the SCG is suspended, the terminal device may use a blind detection parameter corresponding to single connectivity, which is equivalent to that a blind detection capability of the terminal device at the MN is returned to the single connectivity. For example, a PDCCH blind detection capability of the terminal device at the MN may be set to be limited by only a quantity of serving cells configured in the MN or by only a sum of quantities of serving cells currently configured in the MN and the SN.

For blind detection allocation between the MN and the SN, the terminal device may change a blind detection parameter of the terminal device in the MCG based on a preset value when the SCG is suspended. Therefore, the terminal device can detect more PDCCHs in the MCG, so that the network device can more flexibly schedule the terminal device through various PDCCHs. This increases a throughput rate of the terminal device.

With reference to the first aspect, in some implementations of the first aspect, the method further includes: When the configuration parameter includes a band combination (band combination), determining, based on the fact indicating whether measurement or uplink data transmission needs to be performed when the SCG is not suspended, whether to change the band combination.

Optionally, when the SCG is suspended, if the terminal device may perform measurement configuration or uplink information sending that is performed before the SCG is suspended, the MN and the SN may perform band combination negotiation again. In other words, before and after the SCG is suspended, the MN and the SN may use different band combinations.

Optionally, in an SCG suspend state, if the terminal device may not perform measurement configuration or uplink data sending that is performed before the SCG is suspended, the terminal device may reserve an SCG configuration that is used before the SCG is suspended, but the band combination may be not subject to the foregoing limitation, for example, more MCG frequencies are configured or a higher multi-input multi-output (MIMO) capability is used.

By changing the configuration parameter of the band combination, when the SCG is suspended, the network device may configure the MCG more flexibly, for example, configure more MCG frequencies or use a higher MIMO capability. This increases a throughput rate of the terminal device.

According to a second aspect, a communication method is provided. The method includes: receiving second information from a network device, where the second information is used to indicate a terminal device to stop suspending an SCG, and stop suspending the SCG based on the second information.

It should be noted that the network device that sends the second information may be the same as or different from the network device in the first aspect. An execution process of the method in the second aspect may be performed at any time before, when, or after the execution process in the first aspect. In other words, there is no sequence of performing the two processes, provided that a combination can be logically established.

Optionally, the second information may further include information used to indicate a first preset value, and the first preset value is used to indicate duration in which the terminal device performs SCG suspension. The terminal device measures actual SCG suspend duration. Therefore, when the actual SCG suspend duration measured by the terminal device is greater than or equal to the first preset value, the terminal device automatically enters an SCG non-suspend state. Optionally, the terminal device sets a timer (timer). When the timer expires, the terminal device enters the SCG non-suspend state.

Optionally, the first preset value may alternatively be a value stored in the terminal device. After entering the SCG suspend state, the terminal device may determine, based on the actually measured duration and the first preset value, whether the terminal device enters the SCG non-suspend state, and does not need to wait for indication information of the network device.

Optionally, the first preset value may be configured based on a service type. For example, for a service having a relatively high service delay requirement, a first preset value corresponding to relatively short duration may be defined, and for a service having a relatively low service delay requirement, a first preset value corresponding to relatively long duration may be defined. The first preset value may alternatively be determined based on statistical data of historical suspend duration.

Optionally, after receiving the second information, the terminal device may stop suspending the SCG. For example, if the terminal device is suspending the SCG or has suspended the SCG when receiving the second information, the terminal device may restore the SCG to the SCG non-suspend state based on the second information, or if the terminal device does not suspend the SCG when receiving the second information, in other words, the SCG is in the non-suspend state, it is equivalent to maintaining the non-suspend state of the SCG.

For example, the second information includes information used to indicate the terminal device to stop suspending the SCG. After receiving the second information, the terminal device may directly stop suspending the SCG based on the second information.

For another example, the second information may further include the information used to indicate the first preset value, and the first preset value is used to indicate the duration in which the terminal device performs SCG suspension. The terminal device measures the actual SCG suspend duration. When the actual SCG suspend duration measured by the terminal device is greater than or equal to the first preset value, the terminal device stops suspending the SCG.

Optionally, the first preset value may alternatively be a value stored in the terminal device, and the terminal device may determine, based on the actually measured SCG suspend duration and the first preset value, whether to stop suspending the SCG, and does not need to wait for the indication information of the network device.

After the terminal device stops suspending the SCG, previous configuration parameters of an MN and an SN that are used when the SCG is not suspended may be reused.

It should be understood that the second information may be not sent. For example, when the terminal device may determine, based on the pre-stored first preset value, whether to stop suspending the SCG, the second information does not need to be sent.

According to a third aspect, a communication method is provided. The method includes: sending, to a terminal device, indication information used to indicate the terminal device to suspend an SCG, or sending, to a terminal device, indication information used to indicate the terminal device to stop suspending an SCG.

It should be noted that the third aspect describes a source of the first information and a source of the second information in the first aspect and the second aspect from the perspective of a network device.

According to a fourth aspect, a communication method is provided. The method includes: A network device sends third information used to indicate a terminal device to initiate random access. The terminal device receives the third information, performs different processing on the third information based on a state indicating whether an SCG is suspended currently, sends reconfiguration completion information corresponding to the SCG to an MN, and sends a response to the third information to the network device. The network device receives the response of the terminal device to the third information.

It should be noted that the network device may also be an MN or an SN.

Optionally, when the SCG is not suspended, the terminal device performs random access on a target SN, and sends radio resource control (RRC) reconfiguration completion information corresponding to the SCG to the MN.

When the SCG is suspended, in other words, when the terminal device starts to suspend the SCG, or is suspending the SCG, or enters a suspend state, the terminal device performs the following processing:

The terminal device does not perform random access, and sends the RRC reconfiguration completion message corresponding to the SCG to the MN.

Alternatively, the terminal device first performs random access on the target SN, and sends the RRC reconfiguration completion message corresponding to the SCG to the MN. After the terminal device stops the random access on the target SN, the terminal device restores SCG suspension.

It should be noted that the random access stop includes a plurality of cases, such as a random access failure, a random access pause, and a random access completion, and all may be referred to as the random access stop. Details are not described herein again.

In the foregoing technical solution, after receiving the third information that is sent by the network device to indicate to initiate random access, the terminal device performs different processing on random access based on the state indicating whether the SCG is suspended currently. Especially, when the SCG is suspended and random access needs to be performed, the terminal device may restore SCG suspension after performing random access on the SN, and the network device does not need to indicate the terminal device again to perform SCG suspension. This reduces information exchange between the terminal device and the network device.

According to a fifth aspect, several different processing methods are provided when a terminal device needs to send uplink data when an SCG is suspended, so that the uplink data that needs to be sent from the suspended SCG can be sent.

In the technical solution of this application, data that originally needs to be sent by using the SCG can still be sent after the SCG is suspended.

With reference to the fifth aspect, in some implementations of the fifth aspect, if it is specified in advance that the terminal device may still send a physical random access channel (PRACH) on the SCG after the SCG is suspended, when the terminal device needs to send uplink data from the SCG after the SCG is suspended, the terminal device may send the PRACH.

Optionally, a timer may be introduced, and the PRACH is not sent within a specified time length of the timer, so as to prevent some packets from frequently triggering the PRACH. For example, a network device configures preset duration and sends the preset duration to the terminal device, and the terminal device receives the preset duration, and does not send the PRACH within the preset duration.

Optionally, the timer may be started when the network device indicates the terminal device to suspend the SCG.

Optionally, a data buffer threshold may be further introduced, and the PRACH is sent only when buffered data exceeds the threshold, so as to prevent some packets from frequently triggering the PRACH.

For example, the network device sends fourth information to the terminal device. The fourth information is used to indicate a preset time period in which the terminal device does not send the PRACH. After receiving the fourth information, the terminal device determines the preset time period based on the fourth information, and prohibits sending the PRACH within the preset time period.

For another example, the network device sends fifth information to the terminal device. The fifth information is used to indicate a data buffer threshold for sending the PRACH by the terminal device. After receiving the fifth information, the terminal device determines the data buffer threshold based on the fifth information, and prohibits sending the PRACH when an amount of buffered data is less than the data buffer threshold.

With reference to the fifth aspect, in some implementations of the fifth aspect, if it is specified in advance that the terminal device cannot send the PRACH after the SCG is suspended, when the terminal device needs to send uplink data from the SCG after the SCG is suspended, by performing information exchange between the terminal device, a master node, and a secondary node, the SCG suspension is stopped, and the uplink data is sent from the restored SCG.

Optionally, the terminal device sends sixth information to the master node. The sixth information is used to indicate that the terminal device needs to send the uplink data from the suspended SCG. The master node receives the sixth information, sends, to the terminal device, second information used to indicate the terminal device to stop suspending the SCG, and sends, to the secondary node, notification information indicating that the terminal device needs to send data from the SCG or information indicating that the terminal device needs to stop suspending the SCG.

Optionally, if the sixth information sent by the terminal device is indication information of a medium access control (MAC) layer, and the indication information is used to indicate a buffer status report (BSR) of the SN, the MN indicates the terminal device to stop suspending the SCG, and sends the indication information of the BSR to the SN, so as to indicate the SN to send uplink data based on the indication information after the SN enters a non-suspend state. In this method, uplink data that needs to be sent when the SCG is suspended can be buffered, and the uplink data is sent after the SCG is suspended.

Optionally, if the sixth information sent by the terminal device is indication information of a physical layer, the MN notifies the SN that the terminal device needs to send uplink data from the suspended SCG, so that the SN schedules the terminal device through a PDCCH.

Optionally, if the sixth information sent by the terminal device is indication information of an RRC layer, the MN indicates the terminal device to stop suspending the SCG, and notifies the SN that the terminal device is to stop suspending the SCG. In this method, the SN can learn of suspension stop information of the terminal device earlier.

In the foregoing method, by performing information exchange between the terminal device, the master node, and the secondary node, the terminal device stops suspending the SCG, and sends uplink data from the SCG, so as to prevent the uplink data from being lost in a suspend state.

With reference to the fifth aspect, in some implementations of the fifth aspect, if it is specified in advance that all data corresponding to an SCG bearer (bearer) may be sent in an MCG bearer, when the terminal device needs to send uplink data from the suspended SCG after the SCG is suspended, the terminal device may change the SCG bearer to the MCG bearer or change a primary path corresponding to an SCG split bearer, to send, from the MCG, the uplink data that needs to be sent.

Optionally, the network device may preconfigure an alternative MCG bearer for the SCG bearer. Therefore, when the SCG is suspended, the terminal device may change the SCG bearer to the MCG bearer. For example, it may be indicated in advance that a specific MCG bearer corresponds to one or more SCG bearers, or some MCG bearers respectively correspond to some SCG bearers, in other words, a mapping relationship between a plurality of MCG bearers and a plurality of SCG bearers is established, and some data radio bearers (DRB) for which an alternative MCG bearer of an SCG bearer needs to be configured may be further determined. Therefore, when the terminal device needs to transmit uplink data from the suspended SCG, the terminal device may determine, based on the mapping relationship, an MCG bearer corresponding to an SCG bearer of the suspended SCG, so as to send the uplink data by using the corresponding MCG bearer.

Optionally, the terminal device may set the primary path corresponding to the SCG split bearer to the MCG. In other words, when the SCG is not suspended, the primary path may be the SCG, or may be the MCG. For example, when a primary path used before a specific SCG is suspended is the SCG, after the SCG is suspended, the primary path may be changed to a corresponding MCG. In this case, the terminal device may send uplink data through a new primary path.

In the several methods for processing uplink data that needs to be sent from a suspended SCG provided in the technical solution of this application, if the PRACH can be sent, a limitation is imposed on some time intervals or buffered data for sending the PRACH, in other words, the terminal device can initiate a PRACH process only when a preset condition is met. Alternatively, the terminal device notifies the MN that uplink data needs to be sent from the suspended SCG, so that the network device performs some operations to enable the terminal device to stop suspending the SCG and send the uplink data on the SCG, or performs some operations to enable the terminal device to change data that originally needs to be sent in the SCG to be sent in the MCG.

According to a sixth aspect, a method for adding or modifying a secondary node is provided. The method includes: A source MN sends SN addition or modification request information to a source SN. The information carries a serving cell index range that can be used by an SCG and that is allocated by the source MN to the source SN. After a period of time, the source MN sends, to a target MN, handover request information for handing over an MN corresponding to a terminal device. The target MN adds a target SN to the terminal device, sends SN addition request information to the target SN, sends handover request acknowledgment information to the source MN, and indicates the terminal device to perform primary cell (PCell) handover.

In the technical solution of this application, when an SN is added or modified, information such as a serving cell index range or a serving cell index is added to request information in an interaction process, so that the target MN does not need to reconfigure a new serving cell index range for the SN, and the SN does not need to reconfigure a new serving cell index for the terminal device. This reduces information exchange caused by reconfiguration performed after addition or modification, and reduces signaling overheads.

According to a seventh aspect, a communication apparatus is provided and includes modules or units configured to perform the method according to any possible implementation of the first aspect to the sixth aspect.

According to an eighth aspect, a communication apparatus is provided and includes a processor. The processor is coupled to a memory, and may be configured to execute instructions or data in the memory, so as to implement the method according to any one of the first aspect to the sixth aspect and the possible implementations thereof. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface.

In another implementation, the communication apparatus is a chip configured in a terminal device. When the communication apparatus is the chip configured in the terminal device, the communication interface may be an input/output interface.

Optionally, the transceiver may be a transceiver circuit. Optionally, the input/output interface may be an input/output circuit.

According to a ninth aspect, a processor is provided and includes an input circuit, an output circuit, and a processing circuit. The processing circuit is configured to: receive a signal via the input circuit, and transmit a signal via the output circuit, so that the processor is enabled to perform the method according to any possible implementation of the first aspect to the sixth aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a tenth aspect, a processing apparatus is provided and includes a processor and a memory. The processor is configured to: read instructions stored in the memory, receive a signal via a receiver, and transmit a signal via a transmitter, to perform the method according to any possible implementation of the first aspect to the sixth aspect.

Optionally, there are one or more processors and one or more memories.

Optionally, the memory may be integrated into the processor, or the memory and the processor are separately disposed.

In a specific implementation process, the memory may be a non-transitory (non-transitory) memory, for example, a read-only memory (read-only memory, ROM). The memory and the processor may be integrated into one chip, or may be disposed in different chips. A type of the memory and a manner in which the memory and the processor are disposed are not limited in embodiments of this application.

It should be understood that, a related data exchange process such as sending of indication information may be a process of outputting the indication information from the processor, and receiving of capability information may be a process of receiving the input capability information by the processor. Specifically, data that is output by the processor may be output to the transmitter, and input data received by the processor may be from the receiver. The transmitter and the receiver may be collectively referred to as a transceiver.

The processing apparatus according to the tenth aspect may be one or more chips. The processor in the processing apparatus may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to an eleventh aspect, a computer program product is provided. The computer program product includes a computer program (which may also be referred to as code or instructions). When the computer program is run, a computer is enabled to perform the method according to any possible implementation of the first aspect to the sixth aspect.

According to a twelfth aspect, a computer-readable medium is provided. The computer-readable medium stores a computer program (which may also be referred to as code or instructions). When the computer program is run on a computer, the computer is enabled to perform the method according to any possible implementation of the first aspect to the sixth aspect.

According to a thirteenth aspect, a communication system is provided. The communication system includes the foregoing network device and terminal device.

DETAILED DESCRIPTION OF ILLUSTRATIVE EMBODIMENTS

Figure 1:
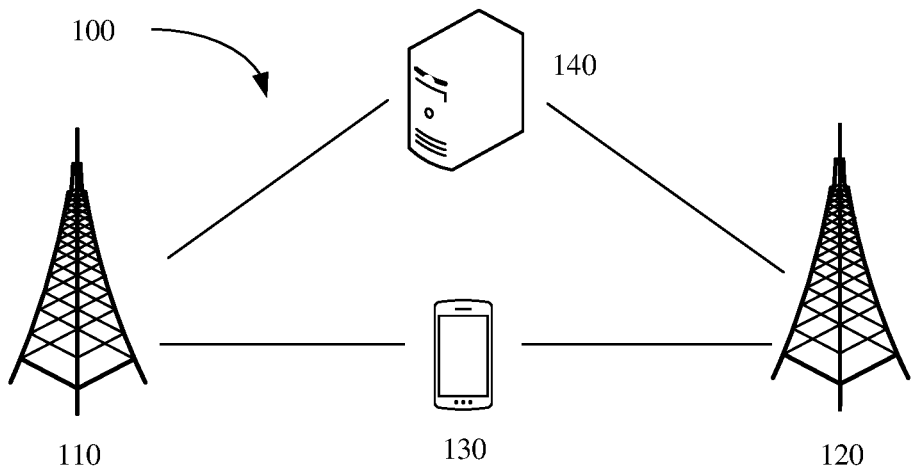
FIG. 1 is a schematic diagram of an evolved universal terrestrial radio access (EUTRA) new radio (NR) dual connectivity (DC) (EN-DC) deployment scenario.

The following describes technical solutions of this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunications system (UMTS), a fifth generation (5th generation, 5G) system such as a new radio (NR) system, a satellite communication system, and another future evolved communication system.

In this embodiment of this application, the network device may be any device having a wireless transceiver function. The network device includes but is not limited to an evolved NodeB (eNB), a radio network controller (RNC), a NodeB (NodeB, NB), a home base station (for example, home evolved NodeB or home NodeB, HNB), a baseband unit (BBU), an access point (AP) in wireless fidelity (Wi-Fi), a wireless relay node, a wireless backhaul node, a transmission point (TP), a transmission reception point (TRP), and the like. Alternatively, the network device may be a next generation NodeB (gNB) or a transmission point (TRP or TP) in a 5G (for example, NR) system, or may be one antenna panel or a group of antenna panels (including a plurality of antenna panels) in the gNB in the 5G system, or may be a network node that constitutes the gNB or the transmission point, such as a baseband unit (BBU) or a distributed unit (DU).

In some deployments, the gNB may include a centralized unit (CU) and a DU. The gNB may further include an active antenna unit (AAU). The CU implements some functions of the gNB, and the DU implements some other functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a medium access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node.

It should be noted that the CU may be classified as an access network device, or may be classified as a core network (CN) device. This is not limited in this application. In embodiments of this application, for ease of understanding and description, the CU is classified as an access network device.

The network device serves a cell, and a terminal device communicates with the cell by using a transmission resource (for example, a frequency domain resource or a spectrum resource) allocated by the network device. The cell may be managed by a macro base station (for example, a macro eNB or a macro gNB), or may be managed by a base station corresponding to a small cell (small cell). Small cells herein may include a metro cell (metro cell), a micro cell (micro cell), a pico cell (pico cell), a femto cell (femto cell), and the like. These small cells have characteristics of small coverage and low transmit power, and are used to provide a high-speed data transmission service.

In embodiments of this application, the terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet, a computer having a wireless transceiver function, a virtual reality (VR) terminal device, an augmented reality (AR) terminal device, a wireless terminal in industrial control, a wireless terminal in self driving (self driving), a wireless terminal in a remote medical, a wireless terminal in a smart grid, a wireless terminal in transportation safety, a wireless terminal in a smart city, a wireless terminal in a smart home, a cellular phone, a cordless telephone set, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a non-public network, or the like.

The wearable device, also be referred to as a wearable intelligent device, is a general term for wearable devices such as glasses, gloves, watches, clothes, and shoes that are developed by applying wearable technologies to intelligent designs of daily wear. The wearable device is a portable device that can be directly worn on the body or integrated into clothes or an accessory of a user. The wearable device is more than a hardware device. The wearable device implements powerful functions through software support, data exchange, and cloud interaction. Wearable intelligent devices in a broad sense include full-featured and large-size devices capable of implementing complete or partial functions without depending on smartphones, for example, smart watches or smart glasses, and devices dedicated to only one type of application function and collaborating with other devices such as smartphones, for example, various smart bands or smart jewelry for monitoring physical signs.

In addition, the terminal device may alternatively be a terminal device in an internet of things (IoT) system. IoT is an important part in development of future information technologies. A main technical feature of the IoT is to connect an object to a network by using a communication technology, to implement an intelligent network for human-machine interconnection and thing-thing interconnection.

A specific form of the terminal device is not limited in this application.

To facilitate understanding of embodiments of this application, the following first briefly describes terms used in this application.

1. Cell (cell): The cell is described by a higher layer from the perspective of resource management, mobility management, or a service unit. Coverage of each network device may be divided into one or more cells. In addition, each cell may correspond to one or more frequencies, in other words, each cell may be considered as an area formed by coverage of the one or more frequencies. The cell may be an area within a coverage area of a wireless network of the network device.

2. Carrier aggregation (CA) technology: The carrier aggregation technology specifically means configuring a plurality of carriers (cells) for a single terminal device to jointly perform data transmission.

3. Primary cell (PCell): The primary cell is a cell that works on a primary component carrier. A terminal device performs an initial connection establishment process or starts a connection re-establishment process in the cell. In a handover process, the cell is indicated as a primary cell.

4. Primary secondary cell (PSCell): The primary secondary cell is a cell, in cells that belongs to an SCG, in which a terminal device is indicated to perform random access or initial physical uplink control channel (PUSCH) transmission (for example, random access is omitted in an SCG changing procedure).

5. Secondary cell (SCell): The secondary cell is a cell that works on a secondary component carrier. Once an RRC connection is established, the secondary cell may be configured to provide additional radio resources. In addition, it should be noted that, in a DC architecture, in some protocols, a cell other than a PCell in an MCG may be referred to as an SCell, and a cell other than a PSCell in an SCG may be referred to as an SCell. In some protocols, a PSCell is also referred to as an SCell.

6. Serving cell: For a terminal device in an RRC_CONNECTED mode, if carrier aggregation/dual connectivity (CA/DC) is not configured, and if there is only one serving cell, the one serving cell is a PCell, or if CA/DC is configured, a serving cell set includes a PCell, a PSCell, and an SCell. Each component carrier (CC) corresponds to one independent cell. A terminal device for which CA/DC is configured is connected to one PCell and a maximum of 31 SCells. A PCell and all SCells of a specific terminal device form a serving cell set of the terminal device. The serving cell may be a PCell, a PSCell, or an SCell.

7. Handover (HO): In a wireless communication system, when a terminal device moves/approaches from one cell to another cell, to keep communication of the terminal device uninterrupted, handover needs to be performed.

8. Random access: Random access is a process in which a terminal device starts to send, to a network device that attempts to perform access, a random access preamble to establish a connection between the terminal device and the network device. Random access may be performed, for example, in a handover procedure, an RRC re-establishment procedure, or the like.

This embodiment of this application mainly describes a dual connectivity scenario. For ease of understanding, the following describes several dual connectivity deployment scenarios. A $4^{th}$ generation (4G) wireless communication system and a 5G wireless communication system are used as examples.

An overall architecture of the 5G wireless communication system includes a 5GC (also referred to as a 5G core, a 5GCN, or a 5G core network) and an NG-RAN (also referred to as a 5G-RAN or the like). The 5GC is a core network of the 5G wireless communication system, and the NG-RAN is a radio access network (radio access network, RAN) of the 5G wireless communication system. The NG-RAN includes two types of RAN nodes: a gNB and an ng-eNB. The gNB provides a terminal device with terminations of new radio (NR) user plane and control plane protocol stacks. The ng-eNB provides the terminal device with terminations of evolved universal terrestrial radio access (E-UTRA) user plane and control plane protocol stacks. A multi-radio dual connectivity (MR-DC) scenario is important in the 5G wireless communication system.

FIG. 1 is a schematic diagram of an EN-DC deployment scenario. EN-DC (E-UTRA NR DC) is also referred to as an Option3 series (Option3 series). To be specific, an LTE base station (for example, an eNB) serves as a master node, and an NR base station (for example, a gNB) serves as a secondary node, to perform dual connectivity (DC). The master node may also be referred to as an anchor base station or a master node (MN), and the secondary node may also be referred to as a secondary node (SN). There is a control plane connection and there may also be a data plane connection between the LTE base station and an evolved packet core (EPC) network, and there may be a data plane connection between the NR base station and the EPC. Both the LTE base station and the NR base station may provide an air interface transmission resource for data transmission between a terminal device and the EPC.

Figure 2:
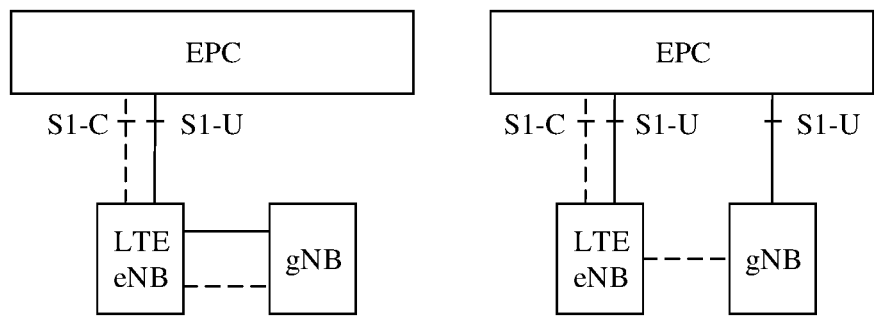
FIG. 2 is a schematic diagram of an NR E-UTRA DC (NE-DC) deployment scenario.

FIG. 2 is a schematic diagram of an NE-DC deployment scenario. NE-DC (NR E-UTRA DC) is also referred to as an Option4 series. To be specific, an NR base station (for example, a gNB) serves as a master node, and an LTE base station (for example, an ng-eNB) serves as a secondary node, to perform DC. In addition, both the master node and the secondary node are connected to a 5GC. Specifically, there is a control plane connection and there may also be a data plane connection between the NR base station and the 5GC, and there may be a data plane connection between the LTE base station and the 5GC. Both the LTE base station and the NR base station may provide an air interface transmission resource for data transmission between a terminal device and the 5GC.

Figure 3:
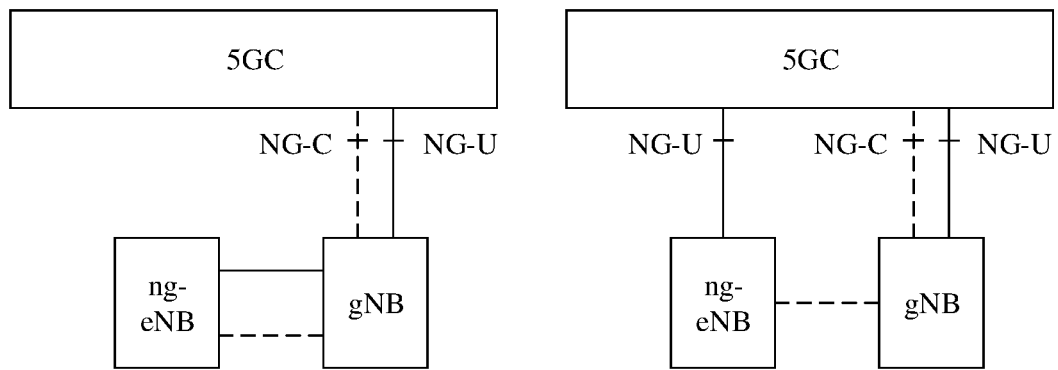
FIG. 3 is a schematic diagram of a next generation (NG) EN-DC deployment scenario.

FIG. 3 is a schematic diagram of an NG EN-DC deployment scenario. NG EN-DC (next generation E-UTRA NR DC) is also referred to as an Option7 series (Option7 series). To be specific, an LTE base station (for example, an ng-eNB) serves as a master node, and an NR base station (for example, a gNB) serves as a secondary node, to perform DC. A difference from EN-DC is that both the master node and the secondary node are connected to a 5GC. Specifically, there is a control plane connection and there may also be a data plane connection between the LTE base station and the 5GC, and there may be a data plane connection between the NR base station and the 5GC. Both the LTE base station and the NR base station may provide an air interface transmission resource for data transmission between a terminal device and the 5GC.

In addition, in an NR-DC (which may also be referred to as NR-NR DC) deployment scenario, both a master node and a secondary node are NR base stations (for example, gNBs), and both are connected to a 5GC. Specifically, there is a control plane connection and there may also be a data plane connection between the NR base station serving as the master node and the 5GC, and there may be a data plane connection between the NR base station serving as the secondary node and the 5GC. Both the master node and the secondary node may provide an air interface transmission resource for data transmission between a terminal device and the 5GC.

In addition, LTE/5GC DC may also be supported. To be specific, both a master node and a secondary node are LTE base stations (for example, ng-eNBs), and both are connected to a 5GC. Specifically, there is a control plane connection and there may also be a data plane connection between the LTE base station serving as the master node and the 5GC, and there may be a data plane connection between the LTE base station serving as the secondary node and the 5GC. Both the master node and the secondary node may provide an air interface transmission resource for data transmission between a terminal device and the 5GC.

A specific DC architecture is not limited in this application. Conventional LTE DC, MR-DC, and other future DC architectures all are applicable. Hereinafter, EN-DC, NE-DC, NG EN-DC, and NR-DC are collectively referred to as MR-DC.

A terminal device may be simultaneously served by a plurality of cells in one base station. Therefore, a serving cell group provided by an MN for the terminal device may also be referred to as a master cell group (master cell group, MCG). Similarly, a serving cell group provided by an SN for the UE is referred to as a secondary cell group (secondary cell group, SCG). The MCG and the SCG each include at least one cell. When the MCG includes only one cell, the cell is a primary cell of the terminal device, that is, a PCell. When the SCG includes only one cell, the cell is a primary secondary cell of the UE, that is, a PSCell. When the MCG or the SCG includes a plurality of cells, definitions of a PCell and a PSCell are explained above. To normalize various nouns in NR, "PCell" and "PSCell" are collectively referred to as "special cell" (Special Cell, SpCell). When the MCG or the SCG includes a plurality of cells, a cell other than an SpCell is referred to as a secondary cell, that is, an SCell. In this case, an SCell and an SpCell in each cell group perform carrier aggregation to jointly provide a transmission resource for the terminal device. When a DC operation is configured for the terminal device, the terminal device needs to simultaneously perform monitoring and data transmission on two air interface links corresponding to the MCG and the SCG.

Figure 4:
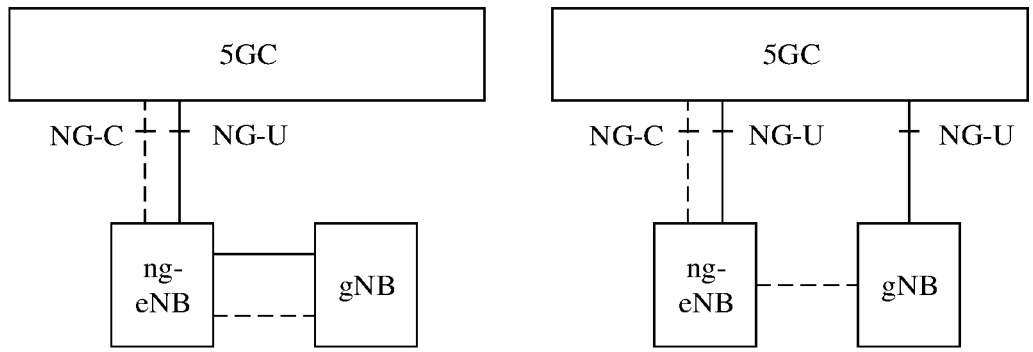
FIG. 4 is a schematic diagram of a communication system applicable to a communication method according to an embodiment of this application.

FIG. 4 is a schematic diagram of a communication system applicable to a communication method according to an embodiment of this application. As shown in FIG. 4, the communication system 400 may include at least one network device, for example, a network device 410 and a network device 420 shown in FIG. 4. The communication system 400 may further include at least one terminal device, for example, a terminal device 430 shown in FIG. 4. The terminal device 430 may be mobile or fixed. Both the network device 410 and the network device 420 are devices that may communicate with the terminal device 430 through a radio link, for example, a base station or a base station controller. Each network device may provide communication coverage for a specific geographical area, and may communicate with a terminal device located in the coverage area (a cell). The wireless communication system 400 may further include at least one core network, for example, a core network 440 shown in FIG. 4. The core network 440 may be a 4G core network, a 5G core network, or the like.

The core network 440 and the terminal device 430 may constitute the dual connectivity architecture in the foregoing deployment scenario. For example, the network device 410 is an LTE base station serving as a master node, the network device 420 is an NR base station serving as a secondary node, and the core network 440 is a 4G core network EPC, there is a control plane connection and a data plane connection between the network device 410 and the core network 440, and there is a data plane connection between the network device 420 and the core network 440, and both the network device 410 and the network device 420 provide an air interface transmission resource for data transmission between the terminal device 430 and the core network 440. Therefore, the dual connectivity deployment scenario shown in FIG. 1 is constituted. In this case, the network device 410 corresponds to the LTE eNB shown in FIG. 1, the network device 420 corresponds to the gNB shown in FIG. 1, and the core network corresponds to the EPC shown in FIG. 1. Similarly, the communication system shown in FIG. 4 may further constitute the dual connectivity architecture in the foregoing another deployment scenario.

FIG. 4 shows an example in which there are two network devices and one terminal device. However, this should not constitute any limitation in this application. Optionally, the communication system 400 may include more network devices, and coverage of each network device may include another quantity of terminal devices. Optionally, the communication system 400 may further include a plurality of core network devices. This is not limited in this embodiment of this application.

The foregoing communication device such as the network device 410, the network device 420, or the terminal device 430 in FIG. 4 may be provided with a plurality of antennas. The plurality of antennas may include at least one transmit antenna configured to send a signal and at least one receive antenna configured to receive a signal. In addition, the communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

Optionally, the communication system 400 may further include another network entity such as a network controller or a mobility management entity. This is not limited in embodiments of this application.

The following describes in detail the method provided in embodiments of this application with reference to the accompanying drawings.

To facilitate understanding of embodiments of this application, a process in which a network device performs DC configuration for a terminal device is first described with reference to FIG. 5 and FIG. 6. The process includes a process of adding an SN and a process of releasing an SN.

Figure 5:
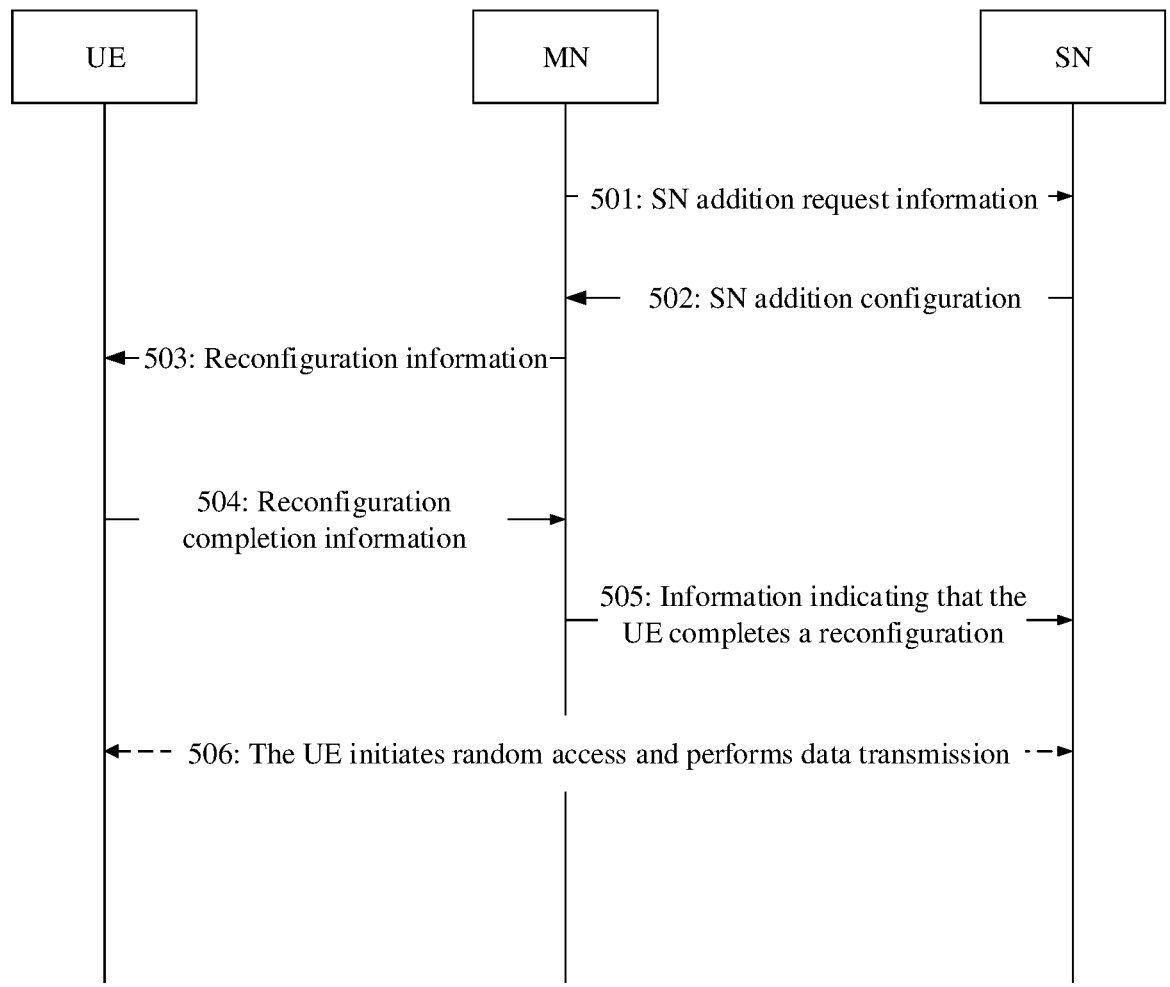
FIG. 5 is a schematic flowchart of a process of adding an SN.

FIG. 5 is a schematic flowchart of a process of adding an SN in EN-DC. As shown in FIG. 5, the process of adding an SN includes step 501 to step 508.

501: An MN sends SN addition request information to an SN, to request the SN to allocate a resource to a bearer of UE. For example, in EN-DC, the bearer may be an evolved radio access bearer (E-RAB), and in a DC architecture in which a 5GC is connected, the bearer may be a protocol data unit (PDU) session or a quality of service flow (QoS flow).

502: The SN sends SN addition request acknowledgment information to the MN. The SN provides configuration information for the UE. For a bearer to which an SCG air interface resource needs to be allocated, the SN provides a configuration of an SCG RLC bearer (bearer) and an SCG cell configuration (that is, a PSCell and an SCell). For a bearer through which data directly arrives at the SN from a core network, a PDCP entity of the UE terminates on the SN, and the SN provides a PDCP configuration, and sends, after the data of the core network is processed by the PDCP, processed data to the UE through the SCG RLC bearer and/or an MCG bearer. In addition, if there is a bearer that requires an SCG transmission resource, the SN triggers the UE to perform RACH, so as to obtain SN air interface resource synchronization. The SN sends the foregoing configuration information provided for the UE to the MN.

503: The MN sends a reconfiguration message to the UE, where the message includes a configuration provided by the SN for the UE.

504: The UE sends a reconfiguration completion message to the MN. To be specific, the UE successfully applies the configuration in the reconfiguration message, and the UE sends the reconfiguration completion message to the MN.

505: The MN notifies the SN that the UE completes a reconfiguration.

506: The UE initiates random access to the SN, to subsequently start data transmission.

It should be noted that there is no strict sequence of performing steps before step 504 and step 506 (but step 505 is performed after step 504).

In the process of adding an SN shown in FIG. 5, the master node sends an addition request to the secondary node. After the secondary node responds to the addition request, the master node performs reconfiguration for the terminal device, so that the terminal device and the secondary node can perform data transmission.

Figure 6:
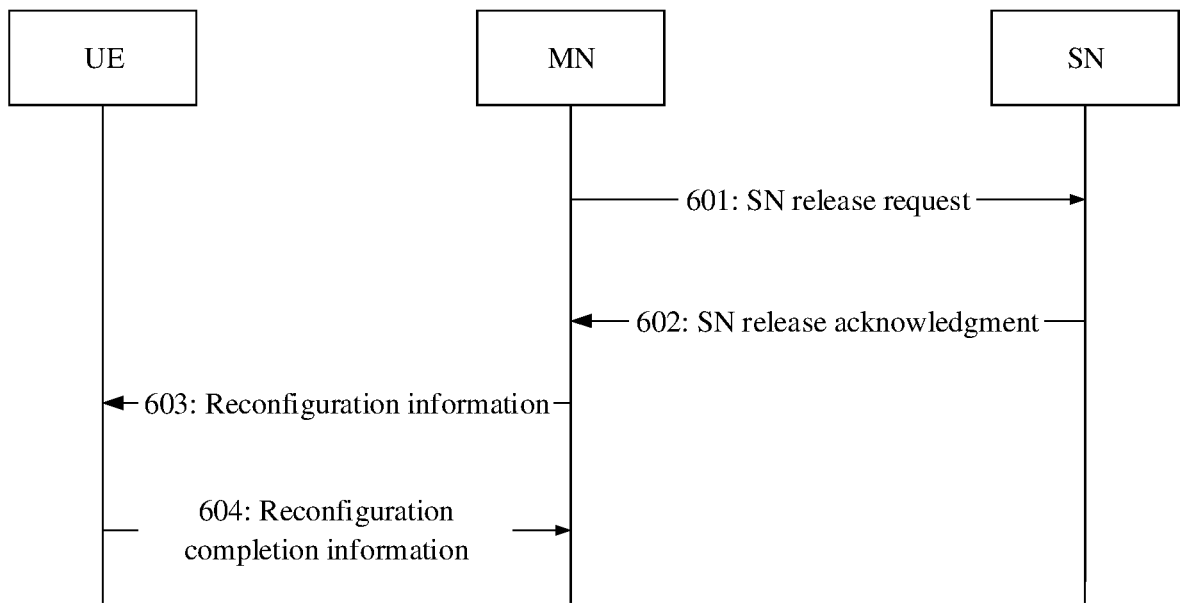
FIG. 6 is a schematic flowchart of a process of releasing an SN.

FIG. 6 is a schematic flowchart of a process of releasing an SN.

601: An MN sends SN release request information to an SN.

602: The SN sends SN release acknowledgment information to the MN. To be specific, the SN performs SN release acknowledgment, and sends the acknowledgment information to the MN.

603: The MN sends reconfiguration information to UE, so that the UE releases an entire SCG configuration.

604: The UE sends a reconfiguration completion message to the MN. To be specific, the UE successfully applies the configuration in the reconfiguration message, and the UE sends the reconfiguration completion message to the MN.

In the process of releasing an SN shown in FIG. 6, the master node sends a release request to the secondary node, after performing acknowledgment, the secondary node sends the acknowledgment information to the master node, and then the master node performs reconfiguration for the terminal device, so that the terminal device releases a configuration for the SN.

It can be learned from FIG. 5 and FIG. 6 that both the process of adding an SN and the process of releasing an SN require information exchange between the UE and the MN and between the MN and the SN for a plurality of times, and require a reconfiguration on an air interface for the UE. In addition, the UE needs to completely release the SCG configuration. When an SN is added subsequently, a set of complete SCG configurations is added again.

Figure 7:
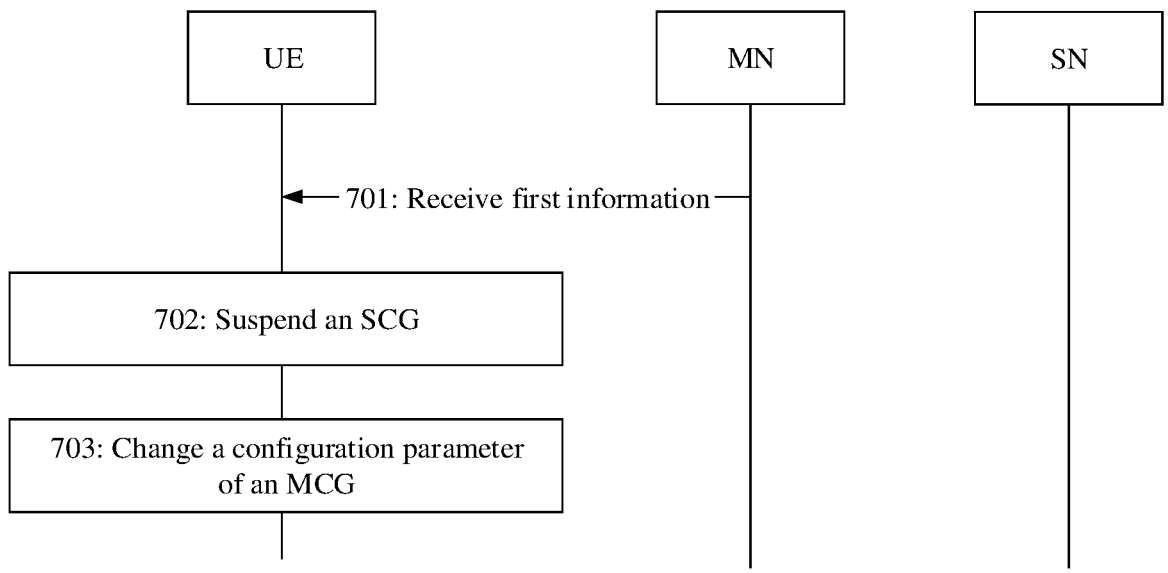
FIG. 7 is a schematic flowchart of a communication method according to an embodiment of this application.

FIG. 7 is a schematic flowchart of a communication method according to an embodiment of this application. FIG. 7 illustrates an SCG suspension process from the perspective of a terminal device.

701: A terminal device receives first information, where the first information is used to indicate the terminal device to suspend an SCG.

It should be noted that the first information is sent by a network device. The network device may be an MN, or may be an SN. In other words, the first information may be sent by the MN, or may be sent by the SN. The MN or the SN may send the first information to the terminal device in a plurality of manners, for example, by using a MAC control element (CE), an RRC message, or indication information of L1.

702: The terminal device suspends the SCG based on the first information.

It should be noted that "suspend/suspension" in this application may also be referred to as "deactive/deactivation", "inactive/inactivation", "dormancy", or the like, and "suspend state" in this application may also be referred to as "deactive state", "inactive state", "dormant state", or the like.

In this application, "suspend/suspension" may mean that the terminal device temporarily stops performing data transmission through an SCG communication link, but the terminal device reserves or stores some or all configurations of the SN, so as to quickly restore the SCG communication link. Similarly, if a PScell is in a suspend state, it indicates that a configuration of the PScell may be reserved, but data transmission performed by using the PScell is stopped.

703: The terminal device changes a configuration parameter of an MCG.

In a normal state (in other words, when the SCG is not suspended or after the SCG stops being suspended in this embodiment of this application), the terminal device imposes different limitations on the MN and the SN, for example, different limitations on power allocation and PDCCH blind detection allocation, for another example, a limitation on a time period for sending uplink data by the terminal device. These limitations may be understood as controlling configuration parameters of different operations of the terminal device, or may be understood as controlling configuration parameters for establishing or maintaining a connection between the terminal device and the MN and between the terminal device and the SN, and the terminal device may perform a corresponding operation only within a range limited by a corresponding configuration parameter, so as to establish and maintain a connection between the MN and the SN. For example, by configuring an available uplink transmission time period of the terminal device, the terminal device may be controlled to send uplink data within a specific time period or at a specific time moment.

In this embodiment of this application, when the SCG is suspended, an original configuration parameter of the MCG is changed, in other words, the configuration parameter of the MCG is changed, so that a throughput rate of the terminal device is increased.

Optionally, changing the configuration parameter of the MCG may be understood as changing behavior of the terminal device that corresponds to the configuration parameter.

It should be noted that the configuration parameter of the MCG may be changed when the SCG starts to be suspended, at any time during the SCG suspension, or at any time after the SCG is suspended (which may also be referred to as an SCG suspend state). A time period for changing the configuration parameter of the MCG does not need to be specifically determined. Therefore, for ease of description, "suspend an SCG", "when an SCG is suspended", and the like all can be used to reflect an "SCG suspension" process.

From the perspective of a category, the foregoing configuration parameter may include, for example, one or more of various parameters such as an available uplink transmission time period, a maximum transmit power, a control channel blind detection parameter, and a band combination (band combination).

From the perspective of a configuration object, the foregoing configuration parameter may alternatively include one or more of parameters such as a configuration parameter of the terminal device, the configuration parameter of the MCG, and a configuration parameter of the SCG.

The configuration parameter of the terminal device may further include one or more of various parameters such as an available uplink transmission time period of the terminal device, a maximum transmit power of the terminal device, a downlink control channel blind detection parameter of the terminal device, and a band combination of the terminal device. Likewise, there are various configuration parameters of the MCG and various configuration parameters of the SCG. Details are not described herein again.

From the perspective of the fact indicating whether the terminal device suspends the SCG, the foregoing configuration parameter may alternatively include a configuration parameter used when the SCG is suspended and a configuration parameter used when the SCG is not suspended.

It should be noted that the configuration parameter used when the SCG is suspended may alternatively be understood as a configuration parameter used when the SCG is in a suspend state, a configuration parameter used after the SCG is suspended, a configuration parameter corresponding to an SCG suspend state, or the like. The configuration parameter used when the SCG is not suspended may alternatively be understood as a configuration parameter used when the SCG is not suspended, a configuration parameter used before the SCG is suspended, a configuration parameter used after the SCG ends/stops suspension, a configuration parameter used when the SCG is in a non-suspend state, a configuration parameter corresponding to the normal state, an original configuration parameter, or the like.

Optionally, the terminal device may change the configuration parameter of the MCG based on a preset configuration parameter sent by the network device. The preset configuration parameter includes the configuration parameter of the MCG and the configuration parameter of the SCG.

It should be noted that the foregoing preset configuration parameter includes a corresponding configuration parameter of the MCG and a corresponding configuration parameter of the SCG that are used when the SCG is suspended and a corresponding configuration parameter of the MCG and a corresponding configuration parameter of the SCG that are used when the SCG is not suspended.

After receiving the preset configuration parameter, the terminal device changes the configuration parameter of the MCG based on a corresponding preset configuration parameter, in the preset configuration parameter, that is used when the SCG is suspended.

In other words, different configuration parameters are preset when the SCG is suspended and when the SCG is not suspended, so that the terminal device can select a configuration parameter based on a currently actual state of the SCG. For example, in the preset configuration parameter, if available uplink transmission time periods are respectively configured when the SCG is suspended and when the SCG is not suspended, the terminal device may select a pre-allocated available uplink transmission time period based on the actual state indicating whether the SCG is suspended. For another example, in the preset configuration parameter, if blind detection parameters are respectively configured when the SCG is suspended and when the SCG is not suspended, the terminal device may select a pre-allocated blind detection parameter based on the actual state indicating whether the SCG is suspended.

It should be understood that the foregoing preset configuration parameter may be sent by the network device to the terminal device, or may be pre-stored in the terminal device.

It should be further understood that each configuration parameter such as the foregoing preset configuration parameter or the configuration parameter of the MCG may include one or more of parameters such as an available uplink transmission time period, a maximum transmit power, and a control channel blind detection parameter.

The configuration parameter of the MCG may be changed based on a configuration parameter of the MCG that is used when the SCG is not suspended, or based on a configuration parameter of the terminal device that is used when the SCG is not suspended, or based on a configuration parameter of the SCG that is used when the SCG is not suspended.

Optionally, when the configuration parameter of the MCG is changed, configuration parameter allocation between the MCG and the SCG may be alternatively changed. In other words, a proportion or a rule of allocating the configuration parameter of the SCG and the configuration parameter of the MCG when the SCG is not suspended may be adjusted, so as to change the configuration parameter of the MCG. For example, if an available uplink transmission time period of the terminal device is T, and the SCG and the MCG are respectively T/2 and T/3 before the SCG is suspended, an allocation proportion for the MCG may be increased after the SCG is suspended, for example, a part or all of the original uplink transmission time period T/3 of the SCG may be allocated to the MCG, or the available uplink transmission time period of the MCG may be directly changed to T. After the SCG is suspended, a resource corresponding to each configuration parameter can be reallocated through configuration parameter reallocation, so that a configuration of the MCG is optimized, to meet a special requirement when the SCG is suspended. For another example, in MR-DC (for example, EN-DC), the network device configures an available subframe assignment (subframe assignment) in the MCG. If the network device configures the subframe assignment in the MCG for the terminal device, when the SCG is not suspended, the terminal device cannot send an uplink physical channel or signal on any subframe except an offset uplink subframe. The offset uplink subframe herein is an uplink subframe that is obtained by the terminal device by referencing one offset on the subframe assignment of the MCG that is configured by the network device. The offset is also configured by the network device for the terminal device. Optionally, when the SCG is not suspended, a limitation on the subframe assignment may take effect only when a frame type of a serving cell is a frame type 1 (which is a full-duplex or half-duplex FDD communication system) or a frame type 2 (which is a TDD communication system). When the SCG is suspended, an available uplink subframe for sending an uplink physical channel or signal by the terminal device is not constrained by a subframe assignment in the MCG configured when the SCG is not suspended, in other words, the terminal device may send an uplink physical channel or signal on all uplink subframes of the MCG.

Optionally, the terminal device may change the configuration parameter of the MCG based on a configuration parameter sent by the network device. The configuration parameter sent by the network device may include one or more of the configuration parameter of the MCG, the configuration parameter of the SCG, and the configuration parameter of the terminal device.

For example, if the terminal device receives only the configuration parameter of the terminal device, the terminal device may directly assign the configuration parameter of the terminal device to the configuration parameter of the MCG, so as to change the configuration parameter of the MCG.

For another example, if the terminal device receives the configuration parameter of the MCG and the configuration parameter of the SCG, the terminal device may allocate the configuration parameter of the SCG to the MCG, so as to change the configuration parameter of the MCG.

Optionally, the terminal device may alternatively change the configuration parameter of the MCG based on an original configuration parameter of the SCG (that is, a configuration parameter of the SCG corresponding to a non-suspend state).

When the configuration parameter includes an available uplink transmission time period, a configuration parameter of the MCG corresponding to a suspend state may be changed by using the following method.

The available uplink transmission time period is a time period for sending an uplink physical channel or signal by the terminal device, in other words, is used to indicate a specific time period or a specific moment for sending an uplink physical channel or signal by the terminal device. If the network device configures an available uplink transmission time period for each of the MCG and the SCG for the terminal device when the SCG is not suspended, a time period for sending an uplink physical channel or signal by each of the MCG and the SCG is limited. Therefore, when the SCG is suspended, the available uplink transmission time period of the MCG may be extended, so that the MCG can perform data transmission in more time periods. In other words, by extending the foregoing available uplink transmission time period of the MCG, the MCG may not comply with an original allocation rule, but may perform uplink data transmission in more available data transmission time periods without being limited by a configuration parameter that is delivered by a master node and that is of the terminal device in an uplink time period that can be used by the MCG.

For example, an available uplink transmission time period of the MCG that is used when the SCG is not suspended is extended, so that an extended available uplink transmission time period further includes a part or all of an available uplink transmission time period of the SCG that is used when the SCG is not suspended or a part or all of the available uplink transmission time period other than the available uplink transmission time periods of the MCG and the SCG. This is equivalent to adding a part or all of the available uplink transmission time period originally allocated to the SCG to the MCG, which may further include adding the available time period other than the available uplink transmission time periods originally allocated to the MCG and the SCG to the MCG. For another example, the available uplink transmission time period of the terminal device may alternatively be determined as the available uplink transmission time period of the MCG that is used after the suspension.

For example, it is assumed that the available uplink transmission time period allocated by the network device to the terminal device is T1 to T10, a time period T1 to T5 may be allocated to the MCG to perform uplink transmission, and a time period T9 to T10 may be allocated to the SCG to perform uplink transmission. In this case, after the SCG is suspended, the available uplink transmission time period of the MCG may be changed as follows. (1) change the available uplink transmission time period of the MCG to T1 to T5 and T9 to T10, in other words, allocate all of the time period originally allocated to the SCG to the MCG. (2) change the available uplink transmission time period of the MCG to T1 to T5 and T9, in other words, allocate a part of the time period originally allocated to the SCG to the MCG. (3) change the available uplink transmission time period of the MCG to T1 to T9, in other words, allocate a part of the time period originally allocated to the SCG to MCG, and allocate all of the other available time period originally not allocated to the MCG and the SCG to the MCG. (4) change the available uplink transmission time period of the MCG to T1 to T7, in other words, allocate a part of the other available time period originally not allocated to the MCG and the SCG to the MCG. Or (5) change the available uplink transmission time period of the MCG to T1 to T10, in other words, allocate all of the available uplink transmission time period corresponding to the terminal device to the MCG for transmitting uplink data.

It should be understood that the foregoing example is merely used to indicate that there is no limitation on a value and a sequence, in other words, there is no sequence of sorting T1 to T10. Details are not described herein again.

In the foregoing process of changing the available uplink transmission time period of the MCG, after the terminal device suspends the SCG, a part or all of the available uplink transmission time period originally allocated to the SCG is allocated to the MCG, or a previously vacant available time period (that is, the available uplink transmission time period other than the available uplink transmission time periods of the MCG and the SCG) is allocated to the MCG. This method is equivalent to extending the available uplink transmission time period of the MCG, so that the MCG can perform uplink data transmission in more time periods.

Optionally, the available uplink transmission time period may be sent by the MN to the terminal device, or may be sent by the SN to the terminal device, or may be sent by both the MN and the SN to the terminal device. For example, in an existing standard, the available uplink transmission time period is sent by the MN to the terminal device.

It should be noted that the available uplink transmission time period sent by the network device may include one or more of the available uplink transmission time period of the terminal device, the available uplink transmission time period of the MCG, and the available uplink transmission time period of the SCG.

For example, if the network device may send only the available uplink transmission time period of the terminal device, the terminal device may change the available uplink transmission time period of the MCG to the available uplink transmission time period of the terminal device, in other words, the terminal device may perform uplink transmission in all of the available uplink transmission time period of the terminal device.

For another example, if the network device may send the available uplink transmission time period of the MCG and the available uplink transmission time period of the SCG, the terminal device may allocate a part or all of the available uplink transmission time period originally allocated to the SCG to the MCG.

For another example, if the network device may send the available uplink transmission time period of the terminal device and the available uplink transmission time period of the SCG, the terminal device may allocate a part or all of the available uplink transmission time period originally allocated to the SCG to the MCG, or may allocate a part or all of the available time period other than the available uplink transmission time periods of the MCG and the SCG in the original available uplink transmission time period of the terminal device to the MCG.

When the configuration parameter includes a maximum transmit power, a configuration parameter of the MCG that is used when the SCG is suspended may be changed by using the following method.

It is assumed that, in a non-suspend state, the network device configures a maximum transmit power Pmax_mcg for the terminal device in the MCG and a maximum transmit power Pmax_scg for the terminal device in the SCG by using an RRC message, and a sum of Pmax_mcg and Pmax_scg is less than or equal to a maximum transmit power Pmax of the terminal device. In this case, when the SCG is suspended, the terminal device may change the maximum transmit power of the MCG to Pmax_mcg+Pmax_scg, or change the maximum transmit power of the MCG to the maximum transmit power of the terminal device (for example, a preset maximum transmit power of the terminal device), or change the maximum transmit power of the MCG to a preset maximum transmit power of the terminal device in the MCG (for example, a maximum transmit power of the terminal device in the MCG that is specified by RAN4 in the 3GPP). Further, Pmax_scg may be allocated to a maximum transmit power of each carrier of the MN in proportion or on average, so as to limit a maximum transmit power of the terminal device on each carrier.

Optionally, Pmax_mcg may be configured by the MN for the terminal device, or may be configured by the SN for the terminal device.

It is assumed that, when the SCG is not suspended, the network device configures a maximum transmit power Pmax_mcg for the terminal device in the MCG and a maximum transmit power Pmax_scg for the terminal device in the SCG by using an RRC message, and a sum of Pmax_mcg and Pmax_scg is greater than a maximum transmit power Pmax of the terminal device. In this case, when the SCG is suspended, the terminal device may change the maximum transmit power of the MCG to the maximum transmit power of the terminal device (for example, a preset maximum transmit power of the terminal device). Further, Pmax_scg may be allocated to a maximum transmit power of each carrier of the MN in proportion or on average, so as to limit a maximum transmit power of the terminal device on each carrier.

In other words, when the sum of the maximum transmit power Pmax_mcg of the terminal device in the MCG and the maximum transmit power Pmax_scg of the terminal device in the SCG is less than or equal to the maximum transmit power of the terminal device, the sum of the two is determined as a maximum transmit power of the MCG, or when the sum of the two is greater than the maximum transmit power of the terminal device, the maximum transmit power of the terminal device is determined as a maximum transmit power of MCG. By changing power allocation, the terminal device increases the maximum transmit power of the MCG when the SCG is suspended. In addition, the maximum transmit power of the SCG is allocated to a maximum transmit power of each carrier of the master node in proportion or on average, a more granular change can be further implemented, and the maximum transmit power of each carrier is controlled at a carrier level Optionally, the maximum transmit power of the terminal device in the MCG may alternatively be configured based on different cases. For example, when uplink sending performed by the terminal device in the MCG overlaps uplink sending performed by the terminal device in the SCG (for example, when an uplink sending slot of the terminal device in the MCG overlaps an uplink sending slot of the terminal device in the SCG), the MCG still uses the maximum transmit power that is used when the SCG is not suspended, otherwise, the MCG uses the preset maximum transmit power of the terminal device (for example, the maximum transmit power of the terminal device that is specified in RAN4 in the 3GPP).

Optionally, the terminal device may determine, when there is an uplink physical channel or signal to be sent in the MCG or according to a specific rule, whether uplink sending in the MCG overlaps uplink sending in the SCG.

In the foregoing method, by changing power allocation, when suspending the SCG, the terminal device may send uplink data by fully using a higher uplink power. This increases a throughput rate of sending data by the terminal device.

When the configuration parameter includes a control channel blind detection parameter, a configuration parameter of the MCG that is used when the SCG is suspended may be changed by using the following method.

A physical downlink control channel (physical downlink control channel, PDCCH) blind detection parameter may be, for example, the reference number of cells for PDCCH blind detection for the CG (MCG or SCG) (the reference number of cells for PDCCH blind detection for the CG).

It is assumed that, when the SCG is not suspended, the network device preconfigures, for the terminal device, two groups of corresponding PDCCH blind detection parameters that are respectively used when the SCG is suspended and when the SCG is not suspended. In this case, the terminal device may select a preconfigured PDCCH blind detection parameter based on the actual state indicating whether the SCG is suspended.

Optionally, the preset blind detection parameters configured by the network device may include a first preset blind detection parameter and a second preset blind detection parameter. The first preset blind detection parameter is a blind detection parameter used by the MCG when the SCG is suspended, and the second preset blind detection parameter is a blind detection parameter used by the MCG when the SCG is not suspended. In this case, the terminal device may select a corresponding blind detection parameter based on the currently actual state. For example, the first preset blind detection parameter is selected when the SCG is suspended, and the second preset blind detection parameter is selected when the SCG is not suspended.

Optionally, the terminal device may select a PDCCH blind detection parameter based on the actual state indicating whether the SCG is suspended. For example, if selection is performed when the SCG is suspended, a blind detection capability of the terminal device at the MCG is limited by only a capability of the terminal device. In other words, when the SCG is suspended, the terminal device may use a blind detection parameter corresponding to single connectivity, which is equivalent to that a blind detection capability of the terminal device at the MN is returned to the single connectivity. For example, if the terminal device reports a carrier aggregation PDCCH blind detection capability PDCCH-BlindDetectionCA (for example, a PDCCH blind detection capability supported after the terminal device is configured more than four carriers), a PDCCH blind detection capability of the terminal device at the MN may be set to be limited by only PDCCH-BlindDetectionCA. It is equivalent to considering only the blind detection parameter PDCCH-BlindDetectionCA. Otherwise, the PDCCH blind detection capability of the terminal device at the MN is limited by only a serving cell quantity configured in the MN or a sum of serving cell quantities currently configured in the MN and the SN.

For blind detection allocation between the MN and the SN, the terminal device may change a blind detection parameter of the terminal device in the MCG based on a preset value when the SCG is suspended. Therefore, the terminal device can detect more PDCCHs in the MCG, so that the network device can more flexibly schedule the terminal device through various PDCCHs. This increases a throughput rate of the terminal device.

When the configuration parameter includes a band combination (band combination), a configuration parameter of the MCG that is used when the SCG is suspended may be changed by using the following method.

The band combination may include two parts. One part is a band parameter, mainly including a band number corresponding to a frequency and a bandwidth level corresponding to CA that has been performed in the band number. The other part is a feature set (feature set), including some capabilities that can be used in uplink and downlink, for example, whether to support cross-carrier scheduling on transmission of different subcarrier spacings of other carriers at a subcarrier spacing of one carrier, whether to support two physical uplink control channel (physical uplink control channel, PUCCH) groups, a downlink supported multiple-input multiple-output (multi-input multi-output, MIMO) layer quantity, and a downlink supported modulation order quantity.

Optionally, when the SCG is suspended, if the terminal device may perform measurement configuration or uplink information sending that is performed when the SCG is not suspended, the MN and the SN may perform band combination negotiation again. In other words, before and after the SCG is suspended, the MN and the SN may use different band combinations.

Optionally, in an SCG suspend state, if the terminal device may not perform measurement configuration or uplink data sending that is performed when the SCG is not suspended, the terminal device may reserve an SCG configuration that is used before the SCG is suspended, but the band combination may be not subject to the foregoing limitation, for example, more MCG frequencies are configured or a higher MIMO capability is used.

By changing the configuration parameter of the band combination, when the SCG is suspended, the network device may configure the MCG more flexibly, for example, configure more MCG frequencies or use a higher MIMO capability. This increases a throughput rate of the terminal device.

In the embodiment shown in FIG. 7, when the SCG is suspended, the terminal device can only perform data transmission by using the MCG, and the configuration parameter of the MCG is more suitable for a suspended case by changing the configuration parameter of the MCG. A configured configuration parameter is more appropriate than a configuration parameter used when the SCG is not suspended. In addition, when the SCG is suspended, a resource originally allocated to the SCG or an unused resource is added to the MCG, so that resources available to the MCG are increased. This increases a throughput rate of the terminal device.

Figure 8:
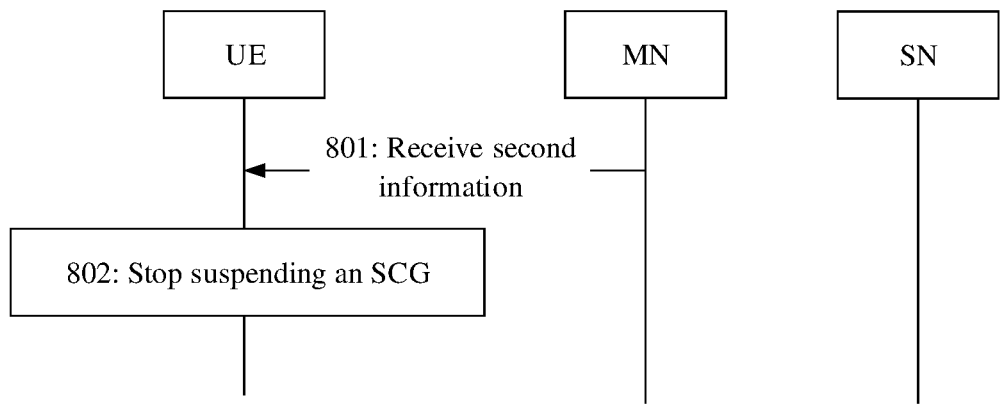
FIG. 8 is a schematic flowchart of a communication method according to an embodiment of this application.

In this embodiment of this application, by using a method shown in FIG. 8, the terminal device alternatively stops suspending the SCG, in other words, restores to a non-suspend state from a suspend state. FIG. 8 is a schematic flowchart of a communication method according to an embodiment of this application.

801: A terminal device receives second information, where the second information is used to indicate the terminal device to enter an SCG non-suspend state.

It should be noted that the second information may be sent by a network device, and the network device may be an MN or an SN. It should be further understood that the network device that sends the second information may be the same as the network device that sends the first information in FIG. 7, or may be different from the network device that sends the first information in FIG. 7.

Optionally, the second information includes information used to indicate the terminal device to stop suspending an SCG. Therefore, after receiving the second information, the terminal device may directly stop suspending the SCG based on the second information.

Optionally, the second information may further include information used to indicate a first preset value, and the first preset value is used to indicate duration in which the terminal device performs SCG suspension. The terminal device measures actual SCG suspend duration. Therefore, when the actual SCG suspend duration measured by the terminal device is greater than or equal to the first preset value, the terminal device automatically enters the SCG non-suspend state. Optionally, the terminal device sets a timer. When the timer expires, the terminal device enters the SCG non-suspend state.

Optionally, the first preset value may alternatively be a value stored in the terminal device. After entering the SCG suspend state, the terminal device may determine, based on the actually measured duration and the first preset value, whether the terminal device enters the SCG non-suspend state, and does not need to wait for indication information of the network device.

Optionally, the first preset value may be configured based on a service type. For example, for a service having a relatively high service delay requirement, a first preset value corresponding to relatively short duration may be defined, and for a service having a relatively low service delay requirement, a first preset value corresponding to relatively long duration may be defined. The first preset value may alternatively be determined based on statistical data of historical suspend duration.

802: The terminal device stops suspending the SCG based on the second information.

Optionally, after receiving the second information, the terminal device may stop suspending the SCG. For example, when receiving the second information, if the terminal device is in the SCG suspend state, the terminal device may restore to the SCG non-suspend state from the SCG suspend state based on the second information, or when receiving the second information, if the terminal device is not in an SCG suspend state or is in a state obtained after suspension, in other words, in the SCG non-suspend state, it is equivalent to that the terminal device maintains the SCG non-suspend state.

For example, the second information includes the information used to indicate the terminal device to stop suspending the SCG. After receiving the second information, the terminal device may directly enter the SCG non-suspend state based on the second information.

For another example, the second information may further include the information used to indicate the first preset value, and the first preset value is used to indicate the duration in which the terminal device performs SCG suspension. The terminal device measures the actual SCG suspend duration. When the actual SCG suspend duration measured by the terminal device is greater than or equal to the first preset value, the terminal device stops suspending the SCG.

Optionally, the first preset value may alternatively be a value stored in the terminal device, and the terminal device may determine, based on the actually measured SCG suspend duration and the first preset value, whether the terminal device enters the SCG non-suspend state, and does not need to wait for the indication information of the network device.

After the terminal device stops suspending the SCG, previous configuration parameters of an MN and an SN that correspond to the non-suspend state may be reused.

It should be understood that step 801 may be not performed. For example, when the terminal device may determine, based on the pre-stored first preset value, whether to stop suspending the SCG, step 801 of sending the second information does not need to be performed.

It should be further understood that, in an actual communication process, the communication processes shown in FIG. 7 and FIG. 8 may be implemented separately or in combination. When the communication processes are implemented in combination, there is no sequence of performing the two communication processes. For example, the first information may be first received, and SCG suspension is performed based on the first information, or the second information may be first received, and SCG suspension is stopped based on the second information. Details are not described herein again.

Figure 9:
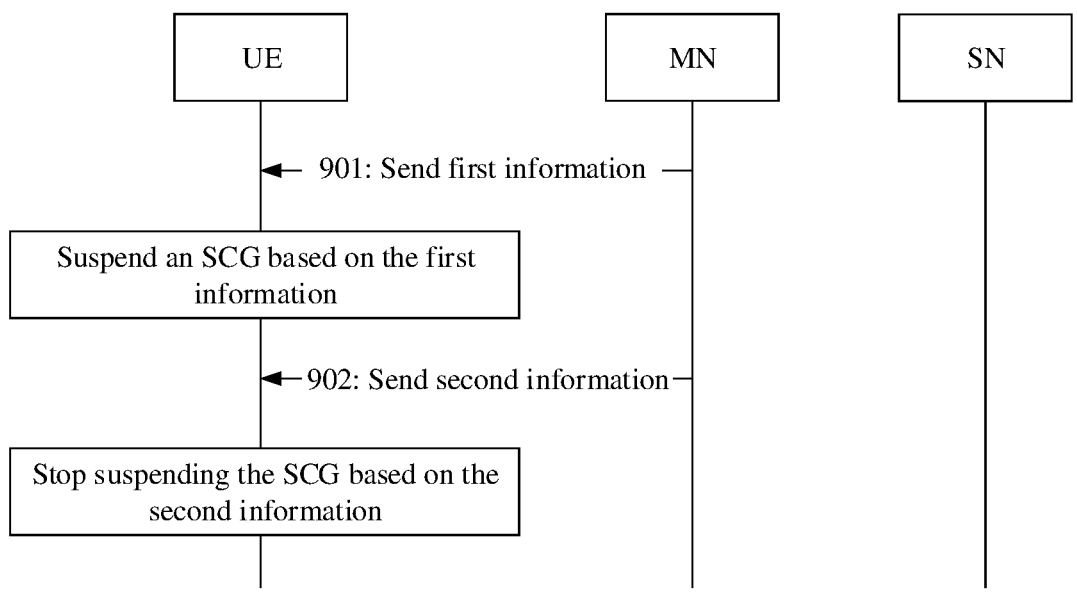
FIG. 9 is a schematic flowchart of a communication method according to an embodiment of this application.

FIG. 9 is a schematic flowchart of a communication method according to an embodiment of this application. As shown in FIG. 9, a network device may send first information to a terminal device, so that the terminal device can suspend an SCG configuration based on the first information, and the network device may further send second information to the terminal device, so that the terminal device can restore to a normal state from an SCG suspend state based on the second information. This embodiment of this application is described in FIG. 9 from the perspective of the network device.

901: The network device sends the first information to the terminal device, where the first information is used to indicate the terminal device to suspend an SCG.

It should be understood that the network device that sends the first information herein may be an MN or an SN. A manner of sending the first information by an SN is not shown in FIG. 9.

902: The network device sends the second information to the terminal device, where the second information is used to indicate the terminal device to enter an SCG non-suspend state based on the second information.

Optionally, the second information may directly indicate the terminal device to enter the SCG non-suspend state.

Optionally, the second information may further include information used to indicate a first preset value, and the first preset value is used to indicate duration in which the terminal device performs SCG suspension.

Figure 10:
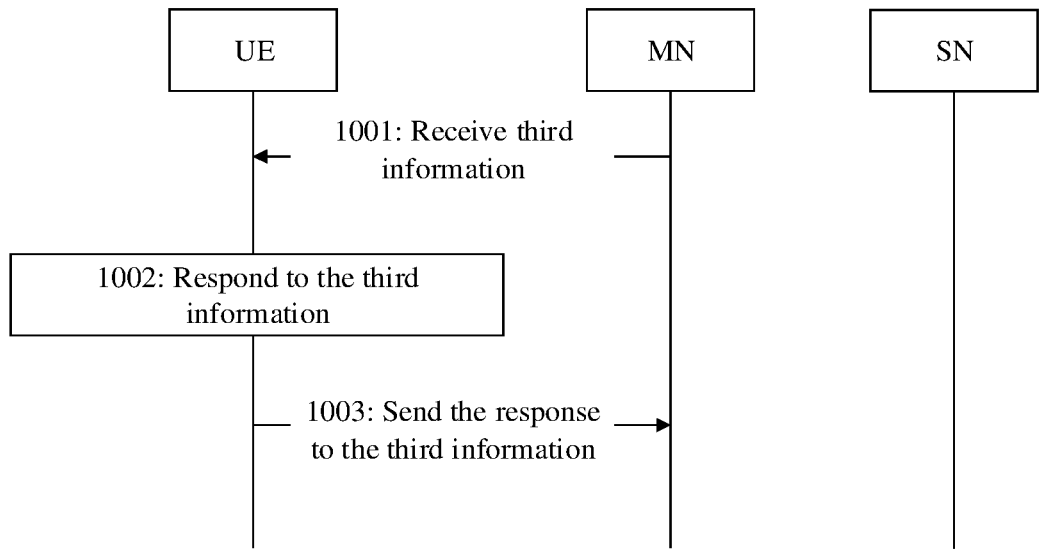
FIG. 10 is a schematic flowchart of a communication method according to an embodiment of this application.

In a communication process, random access may be performed in a handover procedure, an RRC re-establishment procedure, or the like. When the terminal device has received a suspension indication and needs to perform random access on the SN, the terminal device needs to perform processing on the random access. FIG. 10 is a schematic flowchart of a communication method according to an embodiment of this application. As shown in FIG. 10, a terminal device may perform different processing on random access based on different cases when receiving first information indicating to perform suspension or receiving second information indicating to stop suspending an SCG. A method for processing random access when an SCG is suspended is described in FIG. 10 from the perspective of the terminal device.

1001: The terminal device receives third information of a network device, where the third information is used to indicate the terminal device to initiate PSCell addition, PSCell modification, or PSCell changing.

It should be noted that the third information may be sent by an MN to the terminal device, or may be sent by an SN to the terminal device. For PSCell addition, PSCell modification, or PSCell changing, the SN generates an RRC message for the terminal device. The SN first sends the RRC message to the MN, and the MN sends, to the terminal device, an RRC message of the MN including the RRC message sent by the SN. In other words, a container (container) is added to the RRC message sent by the MN to the terminal device, and the container includes the RRC message sent by the SN. The third information may be a reconfiguration message with synchronization (ReconfigurationWithSync).

1002: The terminal device responds to the third information.

When the SCG is not suspended, the terminal device performs random access on a target SN, and sends an RRC reconfiguration completion message corresponding to the SCG to the MN.

When the SCG is suspended, in other words, when the terminal device starts to suspend the SCG, or is suspending the SCG, or enters an SCG suspend state, the terminal device performs the following processing:

The terminal device does not perform random access, and sends the RRC reconfiguration completion message corresponding to the SCG to the MN.

Alternatively, the terminal device first performs random access on the target SN, and sends the RRC reconfiguration completion message corresponding to the SCG to the MN. After the terminal device stops the random access on the target SN, the terminal device restores SCG suspension.

It should be noted that the random access stop includes a plurality of cases, such as a random access failure, a random access pause, and a random access completion, and all may be referred to as the random access stop. Details are not described herein again.

1003: The terminal device sends the response to the third information to the network device.

The terminal device sends the response to the third information to the MN. If the third information carries the RRC message sent by the SN, the terminal device also needs to send the response to the SN. The terminal device adds response information to be sent to the SN to the RRC message of the MN. Then, the MN sends, to the SN, the response message correspondingly to be sent to the SN.

It should be noted that there is no sequence of performing step 1002 and step 1003.

In the communication method shown in FIG. 10, after receiving the third information that is sent by the network device to indicate to initiate random access, the terminal device performs different processing on random access based on a state indicating whether the SCG is suspended currently. Especially, when the SCG is suspended and random access needs to be performed, the terminal device may restore SCG suspension after stopping the random access on the target SN, and the network device does not need to indicate the terminal device again to perform SCG suspension. This reduces information exchange between the terminal device and the network device.

It should be understood that "when the SCG is suspended" in FIG. 10 is equivalent to that the first information has been received and the suspend state is entered, or that the process shown in FIG. 7 has been performed and the SCG suspend state is entered, and "when the SCG is not suspended" in FIG. 10 is equivalent to that the process shown in FIG. 7 is not performed, or that the process shown in FIG. 8 has been performed and the SCG suspension is stopped. In addition, in the embodiment shown in FIG. 10, a specific manner in which the terminal implements SCG suspension/non-suspension is not limited in this application. Therefore, the embodiment shown in FIG. 10 may be implemented in combination with the embodiment shown in FIG. 7 or FIG. 8, or the embodiment shown in FIG. 10 may be separately implemented. This is not limited When the terminal device suspends the SCG, a case in which the terminal device needs to perform uplink data transmission may further occur. This embodiment of this application provides several different processing methods in which the terminal device needs to send uplink data on the SCG when suspending the SCG. The following describes these methods.

If it is specified in advance that the terminal device may still send a physical random access channel (physical random access channel, PRACH) on the SCG after the SCG is suspended, when the terminal device needs to send uplink data from the SCG after the SCG is suspended, the terminal device may send the PRACH.

Optionally, to prevent some packets from frequently triggering the PRACH, a timer may be introduced, and the PRACH is not sent within a specified time length of the timer. For example, the network device configures preset duration and sends the preset duration to the terminal device, and the terminal device receives the preset duration, and does not send the PRACH within the preset duration.

Optionally, the timer may be started when the network device indicates the terminal device to suspend the SCG.

Optionally, to prevent some packets from frequently triggering the PRACH, a data buffer threshold may be further introduced, and the PRACH is sent only when buffered data that needs to be sent by using the SCG exceeds the threshold. For example, the network device configures a preset data buffer threshold and sends the preset data buffer threshold to the terminal device, and then sends the PRACH only when data actually buffered by the terminal device exceeds the preset data buffer threshold.

For example, the network device sends fourth information to the terminal device. The fourth information is used to indicate a preset time period in which the terminal device does not send the PRACH. After receiving the fourth information, the terminal device determines the preset time period based on the fourth information, and does not send the PRACH within the preset time period.

For another example, the network device sends fifth information to the terminal device. The fifth information is used to indicate a data buffer threshold for sending the PRACH by the terminal device. After receiving the fifth information, the terminal device determines the data buffer threshold based on the fifth information, and does not send the PRACH when an amount of buffered data is less than the data buffer threshold.

Figure 11:
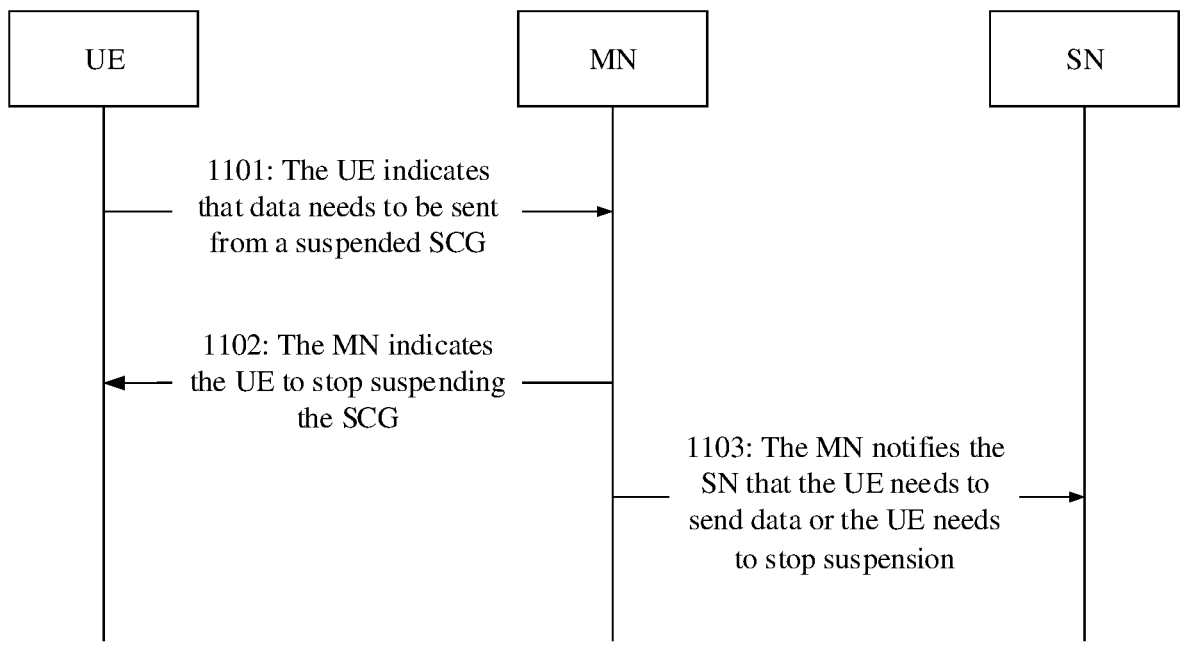
FIG. 11 is a schematic flowchart of a communication method according to an embodiment of this application.

If it is specified in advance that the terminal device cannot send the PRACH after the SCG is suspended, when the terminal device needs to send uplink data from the SCG after the SCG is suspended, the terminal device may send the uplink data by using a method shown in FIG. 11. FIG. 11 is a schematic flowchart of a communication method according to an embodiment of this application. As shown in FIG. 11, information exchange between a terminal device, a master node, and a secondary node may be performed to send uplink data.

1101: The terminal device sends, to the MN, indication information indicating to send uplink data from a suspended SCG.

The terminal device sends sixth information to the MN. The sixth information is used to indicate the terminal device to send the uplink data from the suspended SCG.

Optionally, the sixth information may be indication information of a MAC layer, indication information of a physical layer, or indication information of an RRC layer.

1102: The MN sends, to the UE, information indicating the UE to stop suspending the SCG.

The MN sends second information to the terminal device. The second information is used to indicate the terminal device to stop suspending the SCG, in other words, enter an SCG non-suspend state. It should be noted that the second information may be the second information in FIG. 9.

In other words, after receiving the sixth information, the MN learns, based on the sixth information, that the terminal device needs to send data from the SCG, and therefore may send the second information to indicate the terminal device to restore the suspended SCG to the non-suspend state.

1103: The MN notifies the SN that the terminal device needs to send the uplink data from the suspended SCG, or notifies the SN that the terminal device needs to stop suspending the SCG.

The MN determines, based on the sixth information, seventh information to be sent to the SN, and sends the seventh information to the SN.

Optionally, the sixth information may be a buffer status report (buffer status report, BSR), and the terminal device adds BSR information of the SN to the BSR sent to the MN.

When the MN receives the sixth information, the MN sends the BSR information of the SN, that is, the seventh information, to the SN, so as to indicate the SN to schedule the uplink data based on the seventh information after the SCG enters the non-suspend state. In this method, after the uplink data that needs to be sent when the SCG is suspended is buffered, the network device can be notified, so that the network device indicates the terminal device to stop suspending the SCG, so as to schedule the uplink data in the SCG.

Optionally, when the sixth information received by the MN is the indication information of the physical layer, the seventh information may be used to indicate the SN to schedule the terminal device through a PDCCH.

Optionally, when the sixth information received by the MN is the indication information of the RRC layer, the seventh information may be used to notify the SN that the terminal device is to stop suspending the SCG. In this example, after receiving the sixth information, the MN separately sends the second information to the terminal device and sends the seventh information to the SN, and does not need to wait for the terminal device to stop suspending the SCG before sending the seventh information.

In the foregoing method, by performing information exchange between the terminal device, the master node, and the secondary node, the terminal device stops suspending the SCG, and sends uplink data from the SCG, so as to prevent the uplink data from being lost in a suspend state.

If it is specified in advance that all data corresponding to an SCG bearer (bearer) may be sent in an MCG bearer, when the terminal device needs to send uplink data from the suspended SCG after the SCG is suspended, the terminal device may send the uplink data by using the following method.

Optionally, for the SCG bearer, the network device may preconfigure an alternative MCG bearer for the SCG bearer. Therefore, when the SCG is suspended, the terminal device may change the SCG bearer to the MCG bearer.

Optionally, it may be indicated in advance that a specific MCG bearer corresponds to one or more SCG bearers, or some MCGs bearers respectively correspond to some SCGs bearers, in other words, a mapping relationship between a plurality of MCG bearers and a plurality of SCG bearers is established, and some data radio bearers (data radio bearer, DRB) for which an alternative MCG bearer of an SCG bearer needs to be configured may be further determined. Therefore, when the terminal device needs to transmit uplink data from the suspended SCG, the terminal device may determine, based on the mapping relationship, an MCG bearer corresponding to an SCG bearer of the suspended SCG, so as to send the uplink data by using the corresponding MCG bearer.

Optionally, for an SCG split bearer, the terminal device may set a primary path (primary path) corresponding to the SCG split bearer to the MCG. In other words, when the SCG is not suspended, the primary path may be the SCG, or may be the MCG. For example, when a primary path used before a specific SCG is suspended is the SCG, after the SCG is suspended, the primary path may be changed to a corresponding MCG. In this case, the terminal device may send uplink data through a new primary path. The following lists two cases in which the primary path may be set to the SCG.

Case 1: When a DRB configures a PDCP layer for replication but is not activated for replication, a PDCP of the terminal device places a PDCP DATA PDU in an RLC entity corresponding to the primary path (that is, an RLC entity corresponding to the SCG or an RLC entity corresponding to the MCG). If the network device previously sets the SCG as the primary path, after the SCG is suspended, when there is uplink data that needs to be transmitted in the SCG, the terminal device sets the primary path of the DRB to the MCG.

Case 2: When a DRB is not configured with a PDCP layer replication function, and a sum of a total amount of data that needs to be transmitted by a PDCP and an amount of data that needs to be initially transmitted by an RLC layer is less than a data transmission threshold (which may be understood as a data amount threshold of data transmission, and data is to be offloaded to two RLC entities only when a data amount reaches the threshold), the terminal device places a PDCP DATA PDU in an RLC entity corresponding to the primary path. If the network device previously sets the SCG as the primary path, after the SCG is suspended, when there is uplink data that needs to be transmitted in the SCG, the terminal device sets the primary path of the DRB to the MCG.

In the foregoing several methods, the terminal device needs to send the uplink data from the suspended SCG. In this case, if the PRACH can be sent, a limitation is imposed on some time intervals or buffered data for sending the PRACH, in other words, the terminal device can initiate a PRACH process only when a preset condition is met. Alternatively, the terminal device notifies the MN that uplink data needs to be sent from the suspended SCG, so that the network device performs some operations to enable the terminal device to stop suspending the SCG and send the uplink data on the SCG, or performs some operations to enable the terminal device to change data that originally needs to be sent in the SCG to be sent in the MCG.

It should be understood that sequence numbers of the foregoing processes do not mean execution orders in the foregoing embodiments. The execution sequences of the processes should be determined based on functions and internal logic of the processes, and should not be construed as any limitation on the implementation processes of embodiments of this application.

Figure 12:
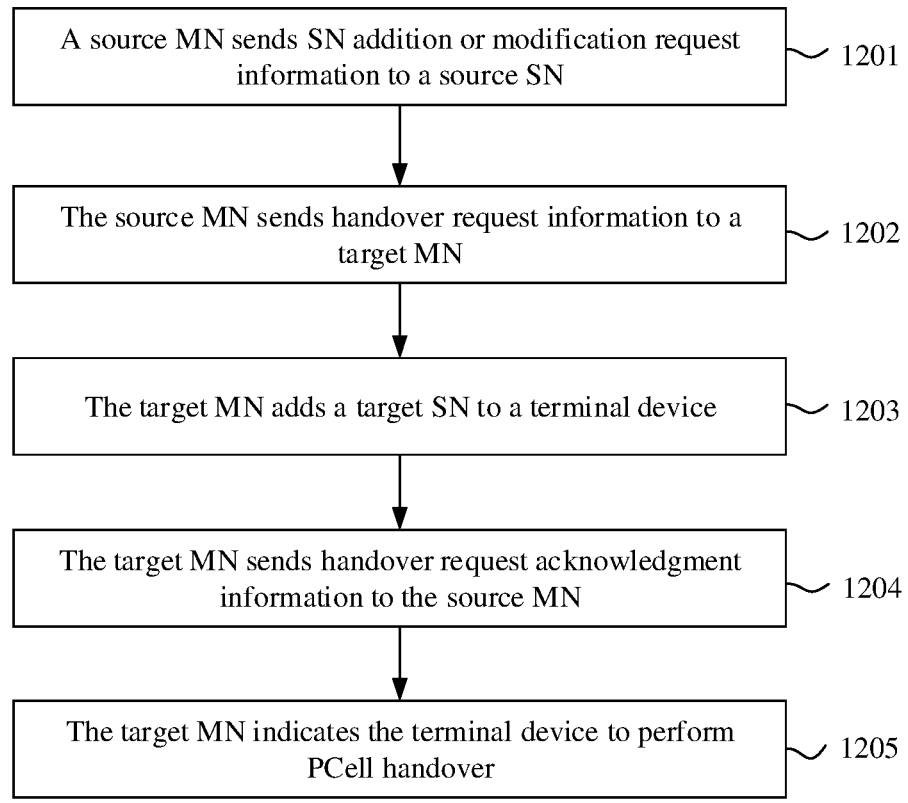
FIG. 12 is a schematic flowchart of a method for adding or modifying a secondary node according to an embodiment of this application.

In MR-DC, when a secondary node is added, the MN sends, to the SN, a serving cell index range in an SCG that can be used by the SN. For example, a lower limit and an upper limit of a serving cell index that can be used by the SCG are added to cell configuration information CG-ConfigInfo sent by the MN to the SN. The SN can only use a service cell index in this range. The SN needs to include a serving cell index corresponding to each serving cell in configuration information of the terminal device. However, currently, during MN handover, a source MN does not send the serving cell index range previously sent to the SN to a target MN. In this way, the target MN may re-allocate a new serving cell index range to the SN (a source SN or a target SN). The SN may need to re-allocate a new serving cell index range to the terminal device. In this case, the configuration information sent by the SN to the terminal device carries these new serving cell indexes. This causes large overheads for the SN to send the configuration information to the terminal device. FIG. 12 is a schematic flowchart of a method for adding or modifying a secondary node according to an embodiment of this application.

1201: A source MN sends SN addition or modification request information to a source SN.

The information carries a serving cell index range that can be used by an SCG and that is allocated by the source MN to the source SN.

1202: The source MN sends handover request information to a target MN.

After a period of time after step 1201 is performed, the source MN determines to hand over an MN corresponding to a terminal device. The source MN sends, to the target MN, handover request information for handing over the MN corresponding to the terminal device.

The handover request information carries indication information that is sent by the terminal device to the MN and that indicates to send uplink data from a suspended SCG. For example, handover preparation information in the handover request information sent by the source MN to a target SN carries a serving cell index range of in SCG that is allocated by the source MN to the source SN.

1203: The target MN adds the target SN to the terminal device.

The target SN and the source SN may be a same SN, or may not be a same SN.

(1203*a*) The target MN sends SN addition request information to the target SN, where the request information may carry a serving cell index range in the SCG that is previously allocated by the source MN to the source SN.

(1203*b*) The target SN configures related information for the terminal device. The target SN may allocate a serving cell index based on the serving cell index range in the SCG sent by the target MN. For example, the target SN may maintain an index of each serving cell that is previously allocated by the source SN to the terminal device.

(1203*c*) The target SN sends an SN addition request response information to the target MN. In other words, the target SN acknowledges the SN addition response information to the target MN.

1204: The target MN sends handover request acknowledgment information to the source MN.

After determining that the MN corresponding to the terminal device is changed from the source MN to the target MN, the target MN sends handover acknowledgment information to the source MN.

1205: The target MN indicates the terminal device to perform PCell handover.

In the method shown in FIG. 12, when an SN is added or modified, signaling overheads can be reduced by adding a serving cell index range or a serving cell index to request information in an interaction process.

The foregoing describes the method embodiments in embodiments of this application with reference to the accompanying drawings, and the following describes apparatus embodiments in embodiments of this application. It should be understood that the descriptions of the method embodiments may correspond to the descriptions of the apparatus embodiments. Therefore, for a part not described, refer to the foregoing method embodiments.

Figure 13:
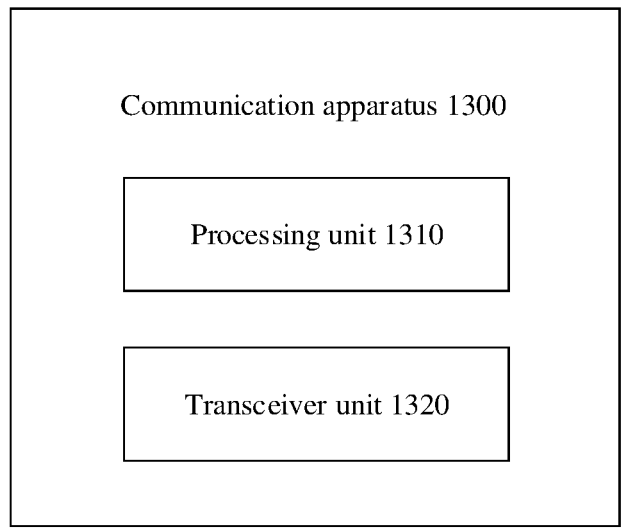
FIG. 13 is a schematic block diagram of a communication apparatus according to an embodiment of this application.

FIG. 13 is a schematic block diagram of a communication apparatus according to an embodiment of this application. As shown in FIG. 13, the communication apparatus 1300 may include a processing unit 1310 and a transceiver unit 1320.

In a possible design, the communication apparatus 1300 may implement an operation corresponding to the terminal device in the foregoing method embodiment. For example, the communication apparatus may be a terminal device, or may be a component disposed in the terminal device, such as a chip or a circuit.

The communication apparatus 1300 may implement corresponding operations of the terminal device in the method embodiments shown in FIG. 7 to FIG. 12, and/or implement the foregoing method for transmitting uplink data after SCG suspension. The communication apparatus 1300 may include units configured to perform the operations performed by the terminal device in the method embodiments shown in FIG. 7 to FIG. 12, and/or units configured to perform the operations performed by the terminal device in the method for transmitting uplink data after SCG suspension. In addition, the units in the communication apparatus 1300 and the foregoing other operations and/or functions are intended to implement corresponding procedures in the foregoing method embodiments.

Optionally, the communication apparatus 1300 further includes a storage unit. The storage unit may be configured to store instructions or data. The processing unit may invoke the instructions or the data stored in the storage unit, to implement a corresponding operation. For example, the storage unit may be further configured to store the foregoing mapping relationship between an MCG bearer and an SCG bearer.

It should be understood that, a specific process in which each unit performs the foregoing corresponding step has been described in detail in the foregoing method embodiments. For brevity, details are not described herein again.

It should be further understood that the transceiver unit 1320 in the communication apparatus 1300 may be implemented as a transceiver or a communication interface. For example, the transceiver unit may correspond to a transceiver 2020 in a terminal device 2000 shown in FIG. 15. The processing unit 1310 in the communication apparatus 1300 may be implemented as at least one processor. For example, the processing unit may correspond to a processor 2010 in the terminal device 2000 shown in FIG. 15.

Figure 14:
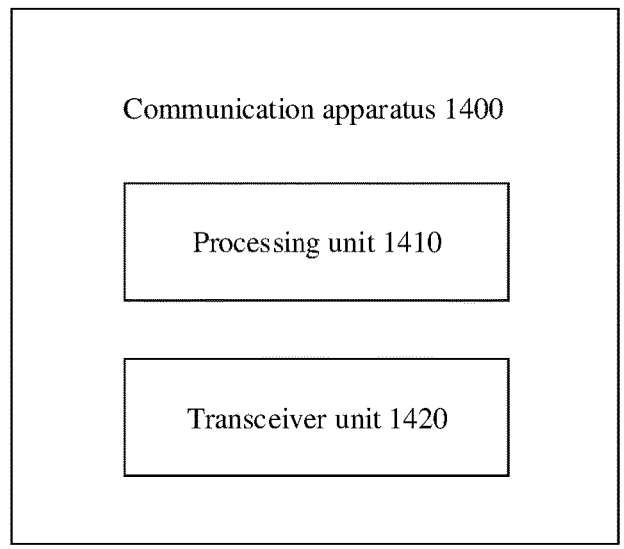
FIG. 14 is a schematic block diagram of a communication apparatus according to an embodiment of this application.

FIG. 14 is a schematic block diagram of a communication apparatus according to an embodiment of this application. As shown in FIG. 14, the communication apparatus 1400 may include a processing unit 1410 and a transceiver unit 1420.

In a possible design, the communication apparatus 1400 may implement an operation corresponding to the terminal device in the foregoing method embodiment. For example, the communication apparatus may be a terminal device, or may be a component disposed in the terminal device, such as a chip or a circuit.

The communication apparatus 1400 may implement corresponding operations of the network device in the method embodiments shown in FIG. 7 to FIG. 12. The communication apparatus 1400 may include units configured to perform the method performed by the network device in the method embodiments shown in FIG. 7 to FIG. 12. In addition, the units in the communication apparatus 1400 and the foregoing other operations and/or functions are intended to implement corresponding procedures in the foregoing method embodiments.

Optionally, the communication apparatus 1400 may further include a storage unit. The storage unit may be configured to store instructions or data. The processing unit may invoke the instructions or the data stored in the storage unit, to implement corresponding operations.

It should be understood that, a specific process in which each unit performs the foregoing corresponding step has been described in detail in the foregoing method embodiments. For brevity, details are not described herein again.

Figure 16:
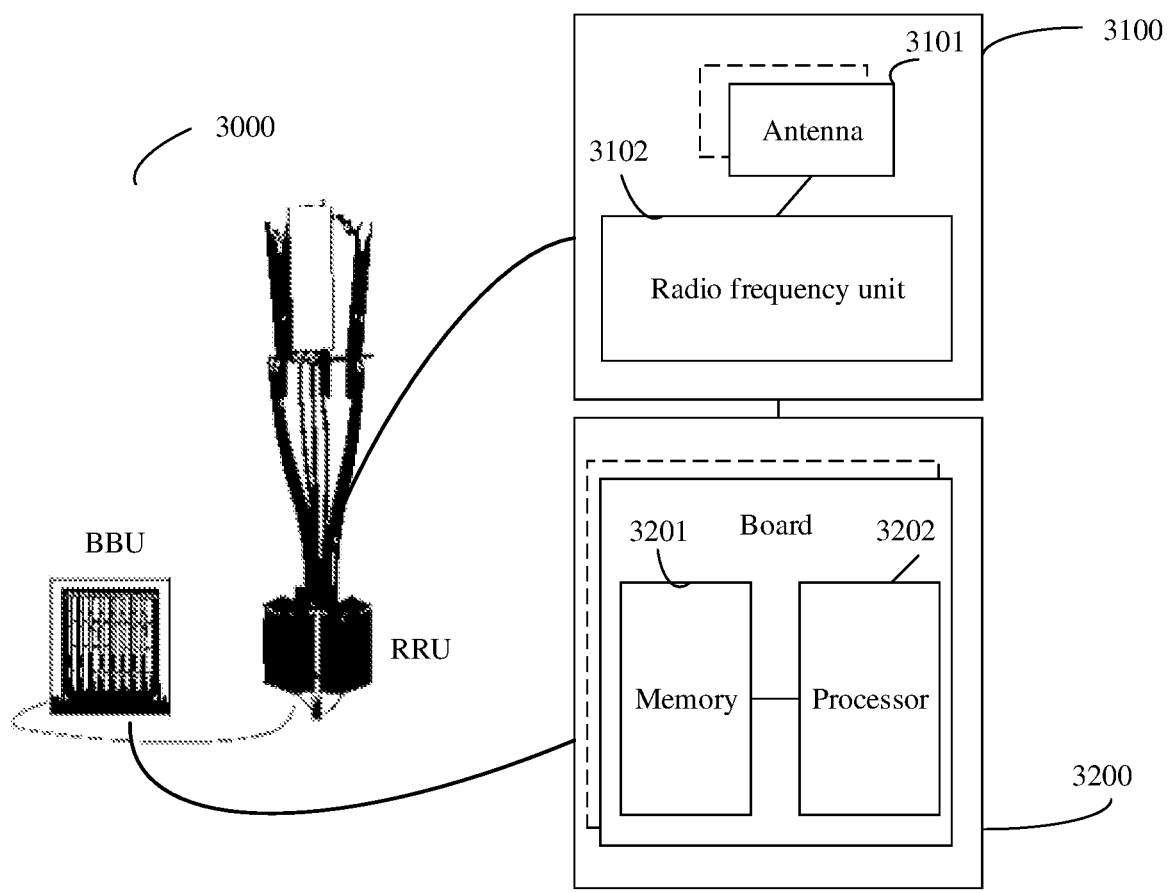
FIG. 16 is a schematic diagram of a structure of a network device according to an embodiment of this application.

It should be further understood that the transceiver unit 1420 in the communication apparatus 1400 may correspond to, for example, a transceiver unit 3100 shown in FIG. 16.

Figure 15:
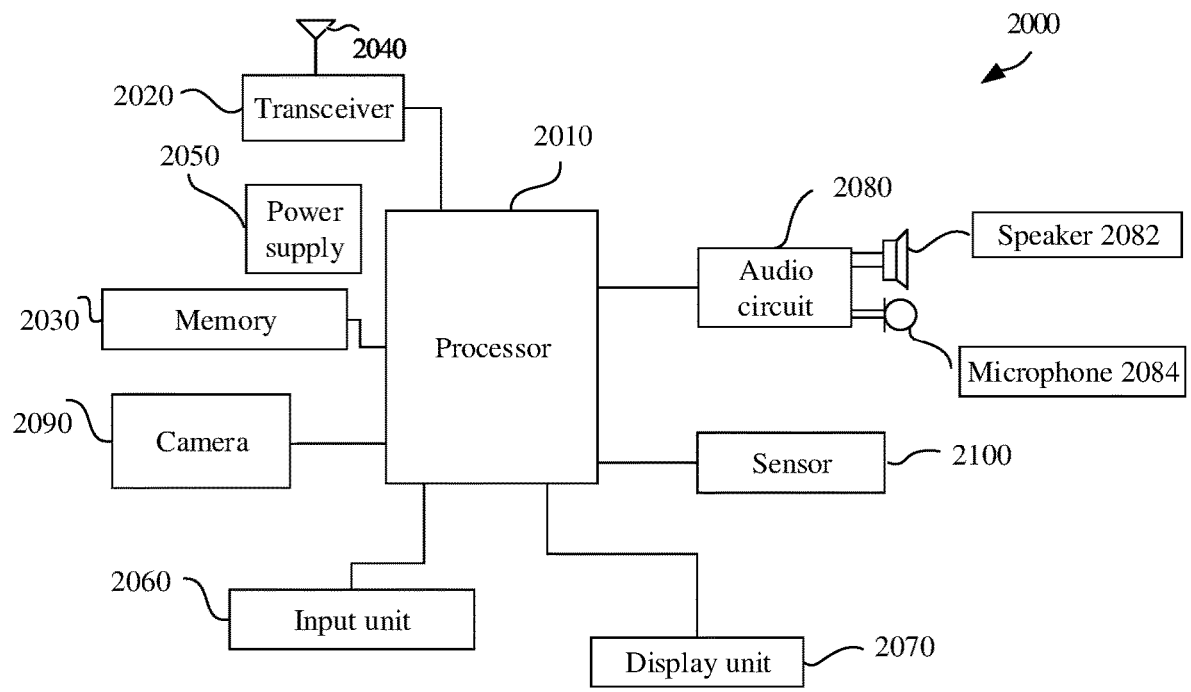
FIG. 15 is a schematic diagram of a structure of a terminal device according to an embodiment of this application.

FIG. 15 is a schematic diagram of a structure of a terminal device 2000 according to an embodiment of this application. The terminal device 2000 may be used in the system shown in FIG. 4, to perform a function of the terminal device in the foregoing method embodiments. As shown in FIG. 15, the terminal device 2000 includes a processor 2010 and a transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 2000 may further include an antenna 2040, configured to send, through a radio signal, uplink data or uplink control signaling that is output by the transceiver 2020.

The processor 2010 and the memory 2030 may be integrated into one processing apparatus. The processor 2010 is configured to execute program code stored in the memory 2030, to implement the foregoing function. In a specific implementation, the memory 2030 may alternatively be integrated into the processor 2010, or may be independent of the processor 2010. The processor 2010 may correspond to the processing unit 1310 in FIG. 13.

The transceiver 2020 may correspond to the transceiver unit 1320 in FIG. 13. The transceiver 2020 may include a receiver (which is also referred to as a receiver machine or a receiver circuit) and a transmitter (which is also referred to as a transmitter machine or a transmitter circuit). The receiver is configured to receive a signal, and the transmitter is configured to transmit a signal.

It should be understood that the terminal device 2000 shown in FIG. 15 can implement processes related to the terminal device in the method embodiments shown in FIG. 7 to FIG. 12. Operations and/or functions of the modules in the terminal device 2000 are intended to implement corresponding procedures in the foregoing method embodiments. For details, refer to the descriptions in the foregoing method embodiments. To avoid repetition, detailed descriptions are appropriately omitted herein.

The processor 2010 may be configured to perform an action that is implemented inside the terminal device and that is described in the foregoing method embodiments, and the transceiver 2020 may be configured to perform an action of sending or receiving that is performed by the terminal device to or from the network device and that is described in the foregoing method embodiments. For details, refer to the descriptions in the foregoing method embodiments. Details are not described herein again.

Optionally, the terminal device 2000 may further include a power supply 2050, configured to supply power to various components or circuits in the terminal device.

In addition, to improve a function of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 16 is a schematic diagram of a structure of a network device according to an embodiment of this application, for example, may be a schematic diagram of a structure of a base station 3000. The base station 3000 may be used in the system shown in FIG. 4, to perform a function of the network device in the foregoing method embodiments. As shown in the figure, the base station 3000 may include one or more radio frequency units, for example, a remote radio unit (remote radio unit, RRU) 3100, and one or more baseband units (BBUs) (which may also be referred to as distributed units (DUs)) 3300. The RRU 3100 may be referred to as a transceiver unit, and correspond to the transceiver unit 1420 in FIG. 14. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (which may also be referred to as a receiver machine or a receiver circuit), and the sending unit may correspond to a transmitter (which may also be referred to as a transmitter machine or a transmitter circuit). The RRU 3100 is mainly configured to: receive and send a radio frequency signal, and perform conversion between the radio frequency signal and a baseband signal, for example, is configured to send indication information to a terminal device. The BBU 3300 is mainly configured to: perform baseband processing, control a base station, and the like. The RRU 3100 and the BBU 3300 may be physically disposed together, or may be physically disposed separately, that is, in a distributed base station.

The BBU 3300 is a control center of the base station, may also be referred to as a processing unit, may correspond to the processing unit 1410 in FIG. 14, and is mainly configured to implement a baseband processing function, for example, channel encoding, multiplexing, modulation, or frequency spread. For example, the BBU (the processing unit) may be configured to control the base station to perform an operation procedure related to the network device in the foregoing method embodiments, for example, generate the foregoing indication information.

In an example, the BBU 3300 may include one or more boards. A plurality of boards may jointly support a radio access network (for example, an LTE network) having a single radio access technology, or may separately support radio access networks (for example, an LTE network, a 5G network, or another network) having different radio access technologies. The BBU 3300 further includes a memory 3201 and a processor 3202. The memory 3201 is configured to store necessary instructions and data. The processor 3202 is configured to control the base station to perform a necessary action, for example, is configured to control the base station to perform the operation procedure related to the network device in the foregoing method embodiments. The memory 3201 and the processor 3202 may serve one or more boards. In other words, a memory and a processor may be independently disposed on each board, or a plurality of boards may share a same memory and a same processor. In addition, a necessary circuit may further be disposed on each board.

It should be understood that the base station 3000 shown in FIG. 16 can implement processes related to the network device in the method embodiments shown in FIG. 7 to FIG. 12. Operations and/or functions of the modules in the base station 3000 are intended to implement corresponding procedures in the foregoing method embodiments. For details, refer to the descriptions in the foregoing method embodiments. To avoid repetition, detailed descriptions are appropriately omitted herein.

The BBU 3300 may be configured to perform an action implemented inside the network device in the foregoing method embodiments, and the RRU 3100 may be configured to perform an action of sending or receiving that is performed by the network device to or from the terminal device and that is described in the foregoing method embodiments. For details, refer to the descriptions in the foregoing method embodiments. Details are not described herein again.

It should be understood that the base station 3000 shown in FIG. 16 is merely a possible architecture of the network device, and should not constitute any limitation on this application. The method provided in this application is applicable to a network device having another architecture, for example, a network device including a CU, a DU, and an active antenna unit (AAU). A specific architecture of the network device is not limited in this application.

An embodiment of this application further provides a processing apparatus, including a processor and an interface. The processor is configured to perform the method in any one of the foregoing method embodiments.

It should be understood that the processing apparatus may be one or more chips. For example, the processing apparatus may be a field programmable gate array (FPGA), an application-specific integrated circuit (ASIC), a system on a chip (SoC), a central processing unit (CPU), a network processor (NP), a digital signal processor (DSP), a micro controller unit (MCU), a programmable logic device (PLD), or another integrated chip.

In an implementation process, steps in the foregoing methods may be completed by using a hardware integrated logical circuit in the processor or by using instructions in a form of software. The steps in the methods disclosed with reference to embodiments of this application may be directly performed and completed by using a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that the processor in embodiments of this application may be an integrated circuit chip, and has a signal processing capability. In an implementation process, steps in the foregoing method embodiments may be completed by using a hardware integrated logic circuit in the processor or instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by using a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that, in embodiments of this application, the memory may be a volatile memory or a non-volatile memory, or may include both a volatile memory and a non-volatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. By way of example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and the method described in this specification is intended to include, but not limited to, these memories and any memory of another proper type.

According to the methods provided in embodiments of this application, this application further provides a computer program product. The computer program product includes computer program code. When the computer program code is run on a computer, the computer is enabled to perform the method in any one of the foregoing embodiments.

According to the methods provided in embodiments of this application, this application further provides a computer-readable storage medium. The computer-readable storage medium stores program code. When the program code is run on a computer, the computer is enabled to perform the method in any one of the foregoing embodiments.

According to the method provided in embodiments of this application, this application further provides a system. The system includes the foregoing one or more terminal devices and the foregoing one or more network devices.

The network device and the terminal device in the foregoing apparatus embodiments completely correspond to the network device or the terminal device in the method embodiments. A corresponding module or unit performs a corresponding step. For example, a communication unit (a transceiver) performs a receiving or sending step in the method embodiments, and a step other than the sending step and the receiving step may be performed by a processing unit (a processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on the computing device may be components. One or more components may reside in a process and/or an execution thread, and the component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system and/or a distributed system, and/or across a network such as the internet interacting with other systems by using the signal).

A person of ordinary skill in the art may be aware that, various illustrative logical blocks (illustrative logical blocks) and steps (steps) that are described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatuses, and units, refer to a corresponding process in the foregoing method embodiments. Details are not described herein again.

In several embodiments provided in this application, it should be understood that the disclosed system, apparatuses, and methods may be implemented in another manner. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit.

In the foregoing embodiments, all or some of the functions of the functional units may be implemented by software, hardware, firmware, or any combination thereof. When software is used to implement embodiments, embodiments may be implemented completely or partially in a form of a computer program product. The computer program product includes one or more computer instructions (programs). When the computer program instructions (programs) are loaded and executed on a computer, the procedures or functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

When the functions are implemented in a form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or a part of the steps in the methods described in embodiments of this application. The foregoing storage medium includes any medium that can store program code, such as a USB flash drive, a removable hard disk, a ROM, a random access memory (RAM), a magnetic disk, or an optical disc.

It should be noted that, in embodiments of this application, "used to indicate" may include "used to directly indicate" and "used to indirectly indicate", or may include "used to explicitly indicate" and "used to implicitly indicate". Information indicated by information is referred to as to-be-indicated information. In a specific implementation process, the to-be-indicated information may be indicated in a plurality of manners. By way of example but not limitation, the to-be-indicated information may be directly indicated, for example, by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already known or pre-agreed on. For example, it may alternatively be agreed upon in advance (for example, specified in a protocol) whether an information element exists to indicate the to-be-indicated information, to reduce indication overheads to some extent.

Various numbers such as "first" and "second" in embodiments of this application are merely used for ease of distinguishing, and are not used to limit the scope of embodiments of this application. For example, the various numbers are used for distinguishing between different indication information or different time intervals.

In embodiments of this application, "pre-defined" or "preconfigured" may be implemented in a manner of pre-storing corresponding code, a table, or other related indication information in a device (for example, including a terminal device and a network device). A specific implementation thereof is not limited in this application. "Storage" may be storage in one or more memories. The one or more memories may be separately disposed, or may be integrated into an encoder or a decoder, a processor, or a communication apparatus. Alternatively, some of the one or more memories may be separately disposed, and some of the one or more memories are integrated into a decoder, a processor, or a communication apparatus. A type of the memory may be a storage medium in any form. This is not limited in this application.

Protocols in embodiments of this application may be standard protocols in the communication field, and may include, for example, an LTE protocol, an NR protocol, and a related protocol applied to a future communication system. This is not limited in this application.

In embodiments of this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists. A and B may be singular or plural. The character "/" generally indicates an "or" relationship between associated objects. "At least one of the following items (pieces)" or a similar expression thereof refers to any combination of these items, including any combination of singular items (pieces) or plural items (pieces). For example, at least one of a, b, and c may represent: a, b, c, a and b, a and c, b and c, or a, b, and c, where a, b, and c each may be singular or plural.

In embodiments of this application, descriptions such as "when", "in a case", and "if" mean that a device (for example, a terminal device or a network device) performs corresponding processing in an objective situation, and are not intended to limit time. The device (for example, the terminal device or the network device) is not required to perform a determining action during implementation. The descriptions do not mean any other limitation.

This application describes a plurality of embodiments in detail with reference to a plurality of flowcharts. However, it should be understood that the flowcharts and related descriptions of corresponding embodiments thereof are merely examples for ease of understanding, and shall not constitute any limitation on this application. Each step in each flowchart does not necessarily need to be performed. For example, some steps may be skipped. In addition, an execution sequence of each step is not fixed, and is not limited to that shown in the figure. The execution sequence of each step is determined based on a function and internal logic of the step.

The plurality of embodiments described in this application may be performed by any combination or step by step. For example, in the SCG suspension process shown in FIG. 7, the second information shown in FIG. 8 may also be received, to change to the suspension stop process shown in FIG. 8. For another example, in the SCG suspension process shown in FIG. 7, the third information shown in FIG. 10 may also be received, to change to a process of first processing random access according to one of the methods shown in FIG. 10 and then suspending the SCG based on the first information shown in FIG. 7. Therefore, an execution sequence of each embodiment and a sequence of performing the steps of each embodiment are not fixed, and are not limited to those shown in the figure. The execution sequence of each embodiment and the sequence of performing the steps of each embodiment are determined based on a function and internal logic of each embodiment and the steps.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving first information from a network device, wherein the first information indicates, to a terminal device, to suspend a secondary cell group (SCG);
suspending the SCG based on the first information; and
changing a configuration parameter of a master cell group (MCG),
wherein the configuration parameter is changed to a first preset value associated with suspension of the SCG, and the configuration parameter comprises at least one of an available uplink transmission time period, a maximum transmit power, or a control channel blind detection parameter.

2. The method according to claim 1, wherein the changing the configuration parameter of the MCG comprises:
changing configuration parameter allocation between the MCG and the SCG.

3. The method according to claim 1, wherein the configuration parameter comprises the available uplink transmission time period; and
wherein the changing the configuration parameter of the MCG comprises:
changing the available uplink transmission time period of the MCG based on the available uplink transmission time period of the SCG, wherein the changed available uplink transmission time period of the MCG comprises a part or all of the available uplink transmission time period of the SCG.

4. The method according to claim 1, wherein the configuration parameter comprises the maximum transmit power; and
wherein the changing the configuration parameter of the MCG comprises performing at least one of:
determining, in response to a sum of the maximum transmit power of the MCG and a maximum transmit power of the SCG being less than or equal to a maximum transmit power of the terminal device, the sum of the maximum transmit power of the MCG and the maximum transmit power of the SCG as the maximum transmit power of the MCG; or
determining, in response to the sum of the maximum transmit power of the MCG and the maximum transmit power of the SCG being greater than the maximum transmit power of the terminal device, the maximum transmit power of the terminal device as the maximum transmit power of the MCG.

5. The method according to claim 4, further comprising:
allocating the maximum transmit power of the SCG to a maximum transmit power of each carrier of a master node in proportion or on average.

6. The method according to claim 1, wherein the configuration parameter comprises the control channel blind detection parameter, and
wherein the changing the configuration parameter of the MCG comprises:
receiving preset blind detection parameters from the network device, wherein the preset blind detection parameters comprise a first preset blind detection parameter and a second preset blind detection parameter, wherein the first preset blind detection parameter is a control channel blind detection parameter of the MCG when the SCG is suspended, and wherein the second preset blind detection parameter is a control channel blind detection parameter of the MCG when the SCG is not suspended; and
wherein the changing the configuration parameter of the MCG comprises changing the control channel blind detection parameter of the MCG to the first preset blind detection parameter.

7. The method according to claim 1, further comprising:
receiving preset blind detection parameters from the network device, wherein the preset blind detection parameters comprises a third preset blind detection parameter and a fourth preset blind detection parameter, wherein the third preset blind detection parameter is a control channel blind detection parameter used in a single connectivity state, and wherein the fourth preset blind detection parameter is a control channel blind detection parameter used in a dual connectivity state; and
wherein the changing the configuration parameter of the MCG comprises changing a control channel blind detection parameter of the MCG to the third preset blind detection parameter.

8. The method according to claim 1, further comprising sending sixth information to a master node (MN), wherein the sixth information indicates to the terminal device to send uplink data from the suspended SCG.

9. The method according to claim 1, further comprising:
changing a primary path corresponding to an SCG split bearer of the suspended SCG to an MCG split bearer; and
sending uplink data through a changed primary path.

10. The method according to claim 1, wherein changing the configuration parameter further comprises changing the configuration parameter from a second value associated with non-suspension of the SCG.

11. A communication apparatus, comprising:
a transceiver;
a processor; and
a non-transitory computer readable medium storing a program for execution by the processor, the program including instructions to:
receive, through the transceiver, first information from a network device, wherein the first information indicates a terminal device to suspend a secondary cell group (SCG); and
suspend the SCG based on the first information; and
change a configuration parameter of a master cell group (MCG), wherein the configuration parameter is changed to a first preset value associated with suspension of the SCG, and the configuration parameter comprises at least one of an available uplink transmission time period, a maximum transmit power, or a control channel blind detection parameter.

12. The apparatus according to claim 11, wherein the program further includes instructions to change configuration parameter allocation between the MCG and the SCG.

13. The apparatus according to claim 11, wherein the configuration parameter comprises the available uplink transmission time period; and wherein the program further includes instructions to:
change the available uplink transmission time period of the MCG based on the available uplink transmission time period of the SCG, wherein the changed available uplink transmission time period of the MCG comprises a part or all of the available uplink transmission time period of the SCG.

14. The apparatus according to claim 11, wherein the configuration parameter comprises the maximum transmit power; and
wherein the program further includes instructions to perform at least one of:
determine, in response to a sum of the maximum transmit power of the MCG and a maximum transmit power of the SCG being less than or equal to a maximum transmit power of the terminal device, the sum of the maximum transmit power of the MCG and the maximum transmit power of the SCG as the maximum transmit power of the MCG; or
determine, in response to the sum of the maximum transmit power of the MCG and the maximum transmit power of the SCG being greater than the maximum transmit power of the terminal device, the maximum transmit power of the terminal device as the maximum transmit power of the MCG.

15. The apparatus according to claim 14, wherein the program further includes instructions to allocate the maximum transmit power of the SCG to a maximum transmit power of each carrier of a master node in proportion or on average.

16. The apparatus according to claim 14, wherein the configuration parameter comprises the control channel blind detection parameter; and
wherein the program further includes instructions to:
receive, through the transceiver, preset blind detection parameters from the network device, wherein the preset blind detection parameters comprise a first preset blind detection parameter and a second preset blind detection parameter, wherein the first preset blind detection parameter is a control channel blind detection parameter of the MCG when the SCG is suspended, and wherein the second preset blind detection parameter is a control channel blind detection parameter of the MCG when the SCG is not suspended; and
change the control channel blind detection parameter of the MCG to the first preset blind detection parameter.

17. The apparatus according to claim 14, wherein the program further includes instructions to receive, through the transceiver, preset blind detection parameters from the network device, wherein the preset blind detection parameters comprises a third preset blind detection parameter and a fourth preset blind detection parameter, wherein the third preset blind detection parameter is a control channel blind detection parameter used in a single connectivity state, and wherein the fourth preset blind detection parameter is a control channel blind detection parameter used in a dual connectivity state; and
change the control channel blind detection parameter of the MCG to the third preset blind detection parameter.

18. The apparatus according to claim 11, wherein the program further includes instructions to:
cause the transceiver to send sixth information to a master node (MN), wherein the sixth information indicates the terminal device to send uplink data from the suspended SCG.

19. A non-transitory processor-readable medium having instructions stored thereon for execution by at least one processor of a communications apparatus, the instructions, when executed by the at least one processor, causing the communications apparatus to perform:
receiving first information from a network device, wherein the first information indicates to a terminal device to suspend a secondary cell group (SCG);
suspending the SCG based on the first information; and
changing a configuration parameter of a master cell group (MCG);
wherein the configuration parameter is changed to a first preset value associated with suspension of the SCG, and the configuration parameter comprises at least one of an available uplink transmission time period, a maximum transmit power, or a control channel blind detection parameter.

20. The non-transitory processor-readable medium according to claim 19, wherein the configuration parameter comprises the maximum transmit power; and wherein the instructions causing the communications apparatus to perform the changing the configuration parameter of the MCG include instructions causing the communications apparatus to perform at least one of:
determining, in response to when a sum of the maximum transmit power of the MCG and a maximum transmit power of the SCG being less than or equal to a maximum transmit power of the terminal device, the sum of the maximum transmit power of the MCG and the maximum transmit power of the SCG as the maximum transmit power of the MCG; or
determining, in response to the sum of the maximum transmit power of the MCG and the maximum transmit power of the SCG being greater than the maximum transmit power of the terminal device, the maximum transmit power of the terminal device as the maximum transmit power of the MCG.

* * * * *